United States Patent
Tan et al.

(10) Patent No.: US 8,630,443 B2
(45) Date of Patent: Jan. 14, 2014

(54) AUTOMATIC ERROR DETECTION FOR INVENTORY TRACKING AND MANAGEMENT SYSTEMS USED AT A SHIPPING CONTAINER YARD

(76) Inventors: Han-Shue Tan, Concord, CA (US);
Ke-Ren Chuang, Pleasanton, CA (US);
Jihua Huang, Richmond, CA (US);
Gregory Keith Warf, Fairfield, CA (US)

( * ) Notice: Subject to any disclaimer, the term of this patent is extended or adjusted under 35 U.S.C. 154(b) by 954 days.

(21) Appl. No.: 12/552,109

(22) Filed: Sep. 1, 2009

(65) Prior Publication Data
US 2011/0052001 A1 Mar. 3, 2011

(51) Int. Cl.
*G06K 9/00* (2006.01)
(52) U.S. Cl.
USPC .......................................... 382/100; 382/103
(58) Field of Classification Search
None
See application file for complete search history.

(56) References Cited

U.S. PATENT DOCUMENTS

| | | | |
|---|---|---|---|
| 5,780,826 A * | 7/1998 | Hareyama et al. | 235/385 |
| 6,148,291 A | 11/2000 | Radican | |
| 6,577,921 B1 * | 6/2003 | Carson | 700/214 |
| 7,013,026 B2 * | 3/2006 | Takehara et al. | 382/104 |
| 7,194,330 B2 | 3/2007 | Carson | |
| 7,253,731 B2 * | 8/2007 | Joao | 340/539.13 |
| 7,427,024 B1 * | 9/2008 | Gazdzinski et al. | 235/384 |
| 2007/0010940 A1 * | 1/2007 | Tan et al. | 701/207 |
| 2007/0165208 A1 * | 7/2007 | Cowburn et al. | 356/71 |
| 2007/0222674 A1 * | 9/2007 | Tan et al. | 342/357.02 |

FOREIGN PATENT DOCUMENTS

WO    WO 2009/058778 A9    5/2009

OTHER PUBLICATIONS

U.S. Appl. No. 12/500,478, filed Jul. 9, 2009, Tan.
International Search Report dated Oct. 22, 2010 for Application No. PCT/US2010/047370, 9 pages.

* cited by examiner

*Primary Examiner* — Nancy Bitar
(74) *Attorney, Agent, or Firm* — McCracken & Frank LLC

(57) ABSTRACT

A method automatically detects errors in a container inventory database associated with a container inventory tracking system of a container storage facility. A processor in the inventory tracking system performs a method that: obtains a first data record, identifies an event (e.g., pickup, drop-off, or movement) associated with the first record, provides a list of error types based on the identified event, and determines whether a data error has occurred through a checking process. In each of the checking steps, the processor selects an error type from the list of error types, determines a search criterion based on the selected error type and the first data record, queries the database using the search criterion, compares query results with the first data record to detect data conflicts between them, and upon the detection of the data conflicts, reports that a data error of the selected error type has been detected.

16 Claims, 16 Drawing Sheets

Typical Container Location Naming Convention

Row = 101, 102, etc.　　Bay = 21, 22, 23, 24, etc.
Slot = A, B, C, etc.　　Tier = 1, 2, 3, 4, etc. (Height)

AUTOMATIC ERROR DETECTION FOR INVENTORY TRACKING AND MANAGEMENT SYSTEMS USED AT A SHIPPING CONTAINER YARD

BACKGROUND

1. Technical Field

The present invention relates to the detection of errors in the location of containers in a container shipping yard. More particularly, the present invention relates to the detection of inventory data errors in inventory tracking databases and/or systems indicating the location of the containers.

2. Related Art

Over the past decade, shipping container handling volumes have been increasing dramatically. Such increases in handling volume are adversely affecting real-time order visibility. Every partner to the transactions needs to have access to location information throughout a container's journey. However, in port, containers are routinely not visible to the consignees.

Operations on a shipping container generally include out-gate operations, in-gate operations, and yard operations. These operations are conducted by people including a yard clerk, an operator of transport equipment, and an operator of lift equipment. The transport equipment (or yard tractor) refers to any type of handling equipment (HE) that is capable of moving a container from one location to another but is not capable of lifting the container and setting it down. The lift equipment refers to any type of HE that is capable of lifting a container and setting it down on the ground, on top of another container, or onto another HE for transportation. For convenience herein, the term yard tractor and container handling equipment (CHE) will be used to refer to transport equipment and lift equipment, respectively. Among the operations performed, yard operations (operations in a shipping container yard) are the most time consuming in overall average transactions. Traditionally during yard operations, a yard clerk must accompany the CHE operator to validate the correct container for pick-up. If the container is not where it is supposed to be, the typical yard clerk wanders around the yard looking for it. When the yard clerk finds it, both the yard tractor driver and the CHE operator who picks up and loads the container onto the yard tractor must be radioed to come to the new location. Even so, the right container might be buried by others that need to be moved out of the way by the CHE operator, all while the yard clerk and yard tractor driver are waiting. It would be more efficient if the CHE operator could have the container free to load and in a verified location by the time the yard tractor arrives.

To improve the efficiency of container terminals material handling processes, inventory tracking systems have been developed to track and monitor what really takes place in the yard. Such inventory tracking systems typically employ both real-time positioning technology (such as RFID, GPS, and radio beacons) and wireless communication technologies. These systems enable active tracking of the location of the containers (typically by tracking the movement and location of the various pieces of HE that move the containers), report the tracking information to an inventory tracking database, and interface with a Terminal Operating System (TOS) to update container locations whenever an HE picks up or sets down a container. These inventory tracking systems target to improve the accuracy of the container yard inventory and thereby reduce lost containers, maximize TOS performance, and improve the efficiency of HEs.

Ideally, if the real-time positioning systems can achieve 100% positioning accuracy and if the wireless communication system has zero loss and noise, the inventory tracking systems could indeed achieve 100% accuracy in container inventory locations. However, in reality, inventory errors occur due to sensor biases and noise, communication loss and errors, as well as component or system faults and operational errors.

The prior art inventory tracking systems employ a traditional approach in error handling that relies heavily on operators of HEs to detect and report errors as well as error types. When a CHE operator receives a task (from the TOS through its interface with the inventory tracking system) with a pickup location (sometimes called source location), a container ID, and a drop location (i.e., target location), he drives the CHE to the pickup location to pick up the specified container and then drives to the drop location to place the container at the drop location. The prior art inventory tracking system compares the actual pickup location with the specified pickup location, and the actual drop location with the specified drop location; if there is a discrepancy, the system warns the driver and the driver has to report the error unless the driver made a mistake during the operation. Other than that, it is up to the driver to report errors as he tries to carry out the operation.

For example, if there is no such container at the specified pickup location or the CHE cannot get to the pickup location due to obstructions, the CHE operator needs to report the error using the user interface installed in the CHE and the system will then cancel the task and go to the next task. If the specified container is actually located in a neighboring location, e.g., located beneath the specified pickup location with containers on top of it (containers are typically stacked on top of one another), the CHE operator has to pick the container up at the actual pickup location, which is different from the specified pickup location. Since the system compares the actual pickup location with the pickup location specified in the task and issues a warning if they are different, the CHE operator will receive a warning and has to report the error to clear the warning signal. When the CHE operator carries a container to the drop location and the drop location is already occupied, the CHE operator has to report the error and request the system to re-determine the drop location. On the other hand, if there is no container immediately under the drop location as specified in drop location instructions, the CHE operator will have to drop the container at a location lower than the specified drop location, which will trigger the system to warn the driver of incorrect operation. In this case, the CHE operator must report the error again.

Such a traditional manual-heavy approach employed by the prior art has several drawbacks. First, since the system only concerns itself with the pickup and drop locations, the types of errors detected are limited. Second, inventory errors can only be detected when the system comes to assign a task that involves an incorrect inventory record; consequently, inventory errors can propagate without detection and can cause erroneous reporting of neighboring inventories. Third, this approach requires CHE operators' input for error detection, which creates additional workload for CHE operators, slows down their operations, and wastes precious resources in terms of both CHEs' and CHE operators' time. Fourth, human beings can make mistakes and this approach is vulnerable to errors in CHE operators' inputs. Consequently, CHE operators must input additional information for error correction, or additional personnel must go to the reported locations for manual error correction.

SUMMARY

In accordance with embodiments of the present invention, a system is provided for detecting errors in a container inventory database that improves data quality relative to previous systems by checking and validating inventory data that is reported to or already in the inventory database. The system automatically detects data errors in the inventory database by examining the incoming data records with the data records in the inventory database for any inconsistency or data conflicts, and reports data errors whenever data conflicts are detected. Hence, the system can reduce the occurrence of data errors as well as the propagation of data errors in the inventory database, and thereby improve the quality of the inventory database. Subsequently, the HE operators will encounter significantly fewer errors during operation, which helps relieve them of the additional workload associated with error reporting and reduces the time wasted in searching for the correct locations of containers.

The system includes at least one processing device that performs error detection in the inventory data in a method that first obtains at least one first data record from one of the following sources: the container inventory tracking system, an inventory management system associated with the inventory tracking system, an input device for accepting entries from an operator, and a computer program that generates data records. The method then identifies an event among a predefined set of events based on the first data record. The predefined set of events represents operations associated with container inventories and HEs in the facility. Examples of such operations include container pickup operations, container drop-off operations, and vehicle movement operations where an HE is moving.

The method further provides a list of error types based on the identified event and determines whether a data error has occurred through a process that uses a computer processor which checks each error type. In each of the checking steps, the processor selects an error type from the list of error types, determines a search criterion based on the selected error type and the first data record, queries the database using the determined search criterion, and obtains query results from the database. The query results are then compared with the first data record to detect data conflicts, and upon the detection of a data conflict reports that a data error of the selected error type has been detected. Thus, this method detects data errors automatically without direct operator involvement.

In one embodiment, upon the detection of the data errors, the processor further identifies, among the data records in the query results, data records that are affected by the data conflicts. The identified data records, as well as the first data record, are regarded as erroneous data records. The processor also reports the erroneous data records to at least one of the following: the container inventory tracking system, and an output means for displaying the erroneous data records to an operator. Thereafter, the erroneous data records can be further analyzed for error correction.

In another embodiment, upon detection of the data errors, the processor further modifies the erroneous data records and creates new data records to reflect the errors. Examples of the modifications include changing values in data fields of the erroneous data records to indicate the errors. Furthermore, the processor records the modified erroneous data records to the database so that an operator can find the erroneous data records by searching the changed data fields.

In some embodiments, the detection of errors in the inventory tracking system can be camera-based. With cameras, the processor identifies containers and their location from the camera images. Errors in the inventory tracking database can be determined based on a comparison of containers and container locations from the camera images with information stored in the inventory tracking database.

By automatically detecting errors and identifying erroneous inventory data, the automatic error detection process helps prevent the occurrence and propagation of data errors in the inventory tracking database. Subsequently, the tasks generated by TOS based on the inventory tracking database are more likely to be accurate; therefore, HE operators and other users of the system can focus on completing tasks. Furthermore, the automatic error detection process facilitates the use of analysis tools, including simulation tools and replay tools for error simulation and analysis.

BRIEF DESCRIPTION OF THE DRAWINGS

Further details of embodiments of the present invention are explained with the help of the attached drawings in which:

FIG. 5A shows a top view, while

FIG. 7 further includes the process of detecting inventory errors when a vehicle movement event occurs.

DETAILED DESCRIPTION

Figure 1:
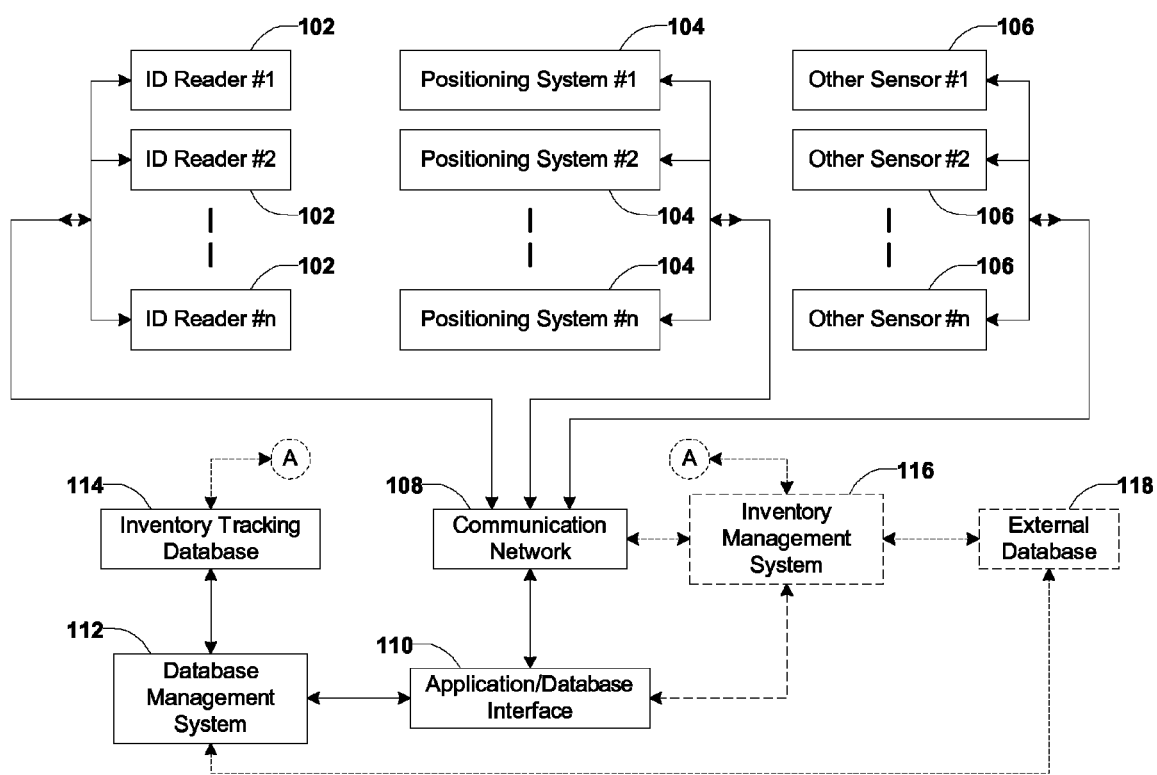
FIG. 1 shows a block diagram of a typical prior art inventory tracking and management system.

FIG. 1 shows a block diagram of an automatic inventory tracking and management system that includes components used in embodiments of the present invention. The inventory tracking and management system identifies the containers being moved, tracks the movement of Handling Equipment (HE) so as to track the containers, communicates the tracking information, and stores the information of the container storage locations and the movement of the HE.

The system includes ID Readers 102, Positioning Systems 104, Other Sensors 106, a Communication Network 108, an Application/Database Interface 110, a Database Management System 112, and an Inventory Tracking Database 114. The ID Readers 102 are used to detect the presence and the identification number of inventory items and HE; the ID Readers may be in the form of an RFID (Radio Frequency ID) exciter/scanner, a bar code scanner, an OCR (Optical Character Recognition) sensor (e.g., cameras), or any other types of devices used for this purpose. The Positioning Systems 104 determine and/or track the locations of inventories, typically by determining the locations of HE that pick up, move, or place inventory items in an inventory storage location. The Positioning Systems 104 can include one or more of the following: a GPS (Global Positioning System) or a DGPS (Differential GPS), INS (Inertial Navigation System), IMU (Inertial Measurement Unit), RTLS (Real Time Locating System), PDS (Position Detection System), and other sensors and systems known in the art that can be used to determine the location of inventory items or HE. Other Sensors 106 include miscellaneous sensors that support the position tracking or management of inventory operations. The Other Sensors 106 can include one or more of the following: a height sensor, mobile RFID exciter/reader, speed sensor, photo sensor, infra-red sensor, OCR (Optical Character Recognition) sensor, bar code scanner, mechanical switch, electronic switch, and sonic sensor.

The information from the ID Readers 102, Positioning Systems 104, and Other Sensors 106 is transported to the Application/Database Interface 110 through the Communication Network 108. The Communication Network 108 can include one or more of the following: a wireless communications network, a LAN (Local Area Network), and a hard-wired proprietary communication network. The Application/Database Interface 110 provides a software interaction capability between the Database Management System 112 and any software application or service that requires access to the information stored in the Inventory Tracking Database 114 and/or provides information to the Inventory Tracking Database 114. The Database Management System 112 controls the organization, storage, management, and retrieval of data in the Inventory Tracking Database 114, while the Inventory Tracking Database 114 stores records of all inventory items and relevant data associated with the inventory. The relevant data can include one or more of the following: an inventory ID, description, product ID, product name, physical attributes of the inventory item, storage location of the inventory item, date and time of inventory item events (such as when the inventory item was placed into or picked up from a storage location), the type and ID of the HE that moved, picked up, or placed the inventory item, the travel history of the HE and any other vehicle equipped with a Positioning System, or other descriptive characteristics as determined by local practice.

The individual modules in the inventory tracking and management system as shown in FIG. 1 may vary from system to system, and the system may include additional modules/components or may be more compact with functions of different modules combined into fewer modules than depicted. For example, some inventory tracking systems may combine the Inventory Tracking Database 114 and the Database Management System 112 into one Inventory Tracking Database System. Furthermore, the Application/Database Interface 110 can be incorporated into the Inventory Tracking Database System 114, especially when the interface is relatively simple. The Application/Database Interface 110, Database Management System 112 and Inventory Tracking Database 114 can be provided in one or more processing devices such as a computer, a digital signal processor, an FPGA, or a microprocessor. Control code for the one or more processors as well as inventory data can be stored in memory devices provided in the one or more processors or connected to the processors.

Optionally, some inventory tracking and management systems can also contain additional modules such as an Inventory Management System 116 and its associated External Database 118 that includes a typical Terminal Operating System (TOS) used in many seaport container storage yards, inland container yard terminals, and rail intermodal container terminals. Such Inventory Management Systems and External Databases typically contain data associated with the inventory ID, storage location, owner of the container, consignee of merchandise inside the inventoried container, transit information and ships loading information, but they typically do not include information associated with the HE or the movement history of the HE.

Figure 2:
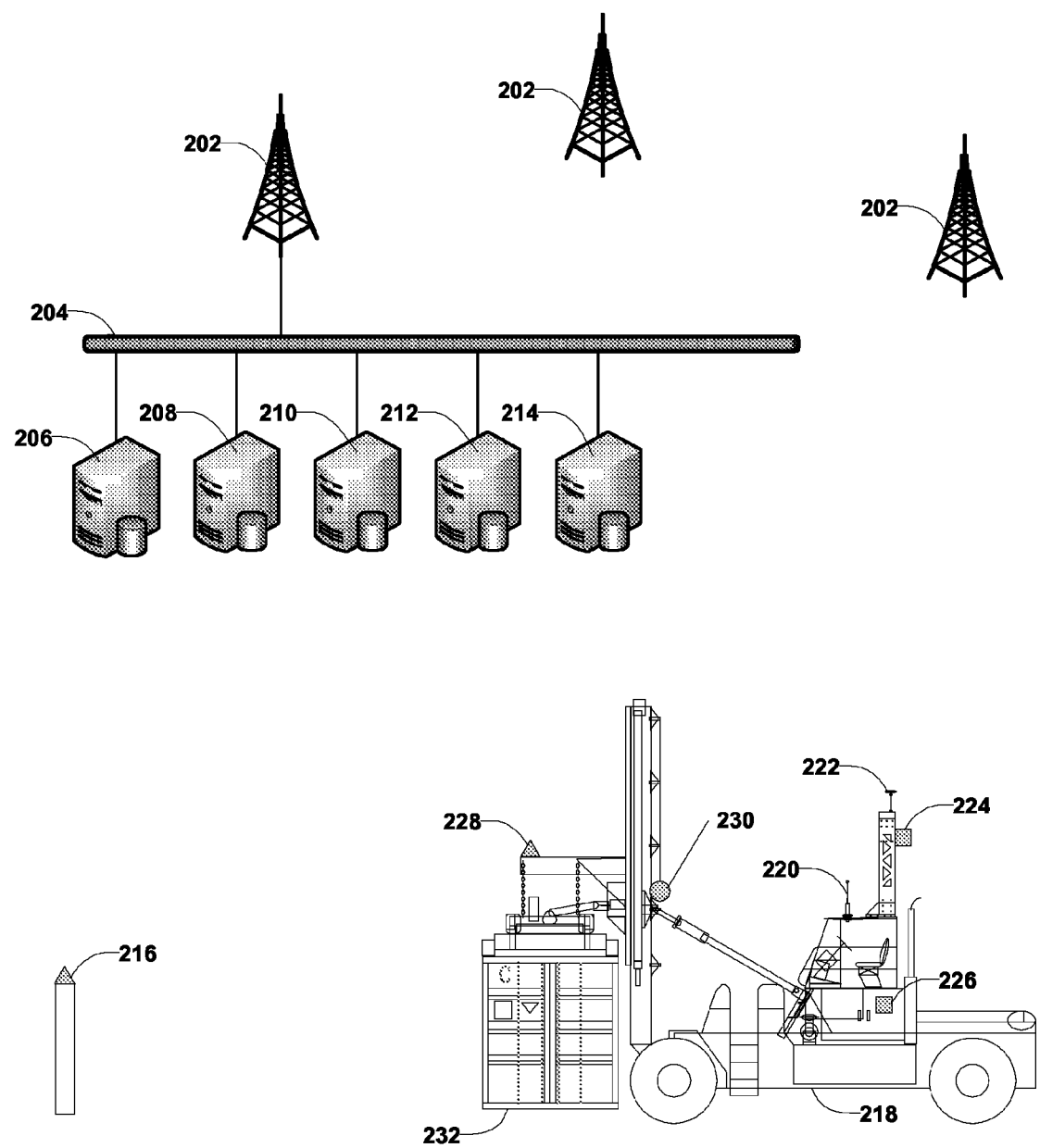
FIG. 2 is a simplified schematic drawing depicting the physical entity of major components of a typical inventory tracking and management system in a shipping container storage facility that is equipped with such a system.

FIG. 2 is a simplified drawing depicting the physical entity of major components of a conventional inventory tracking and management system in a shipping container storage facility. The CHE 218 is a piece of HE that is designed to lift, move and place shipping containers in a shipping container storage facility. Such equipment includes top-picks (or top-lifts), side-picks (or side-lifts, or empty handlers), straddle carriers, reach stackers, rubber tired gantries (RTGs), rail mounted gantries (RMGs), quay cranes, and jockey trucks (also referred to as UTRs, tugs, or yard hustlers). The CHE 218 shown in FIG. 2 is a top-pick. Since this shipping container storage facility is equipped with the inventory tracking system, all HE are equipped with a positioning system that is used to accurately track the location and movement of the HE and thus the shipping containers they move. In this example, the positioning system is made up of a GPS system 222 and an Inertial Measurement Unit (IMU) 224, as well as a processor based unit (CPU) 226 which interfaces with and collects data from the GPS system 222, IMU 224, and other sensors. Other sensors can include a Height Sensor 230 which measures the height at which a shipping container 232 is located when the CHE 218 picks it up or sets it down. The CHE 218 can also be equipped with a mobile ID reader/tag 228, which is detected by fixed ID readers/tags 216 that are installed at specific locations in the shipping container storage facility. As the CHE 218 moves into certain proximity of a fixed ID reader/tag 216, the fixed ID reader/tag 216 detects the presence of the mobile ID reader/tag 228 and thus the presence of the CHE 218, and transmits such information to the application/database interface 206. Alternatively, the mobile ID reader/tag 228 can detect the fixed ID reader/tag 216 when the CHE 218 is close by, and thus provide the CPU 226 additional location-related information to support the positioning of the CHE 218.

The CPU 226 collects the data from all these sensors and uses it to calculate the location of the CHE 218 as the CHE moves about the shipping container storage facility and picks up or sets down a shipping container 232. The CPU 226 also receives information (e.g., engaged or disengaged) from twistlock sensors (a type of switch included in twistlocks that are installed on the spreader bar of the CHE), which indicates the pickup or the drop-off of a shipping container 232. Therefore, the CPU can also determine the location at which the CHE 218 picks up or sets down a shipping container 232. The CHE 218 is further equipped with an onboard communication unit 220, which communicates information from the CPU 226 to other components of the system, including the Application/Database Interface 206, Database Management System 208, Inventory Tracking Database 210, and, optionally, the Inventory Management System 212 and External Database 214, via the Wireless Communication Network 202 and Local Area Network (LAN) 204 similar to the components shown in FIG. 1. The CPU 226 can also receive data, such as instructions that direct the activities of and information requested by the driver of the CHE 218, from those other components via the Wireless Communication Network 202. In addition, the LAN 204 (wired or wireless) provides communication connectivity between the Wireless Communication Network 202, Application/Database Interface 206, Database Management System 208, and Inventory Tracking Database 210. Optionally, the LAN 204 can also connect to the Inventory Management System 212 and External Database 214 to facilitate data or information exchanges between these components. It should be noted that although these components (206, 208, 210, 212, and 214) are drawn as separate physical entities in FIG. 2, some or all of them may reside in the same processing device.

Figure 3:
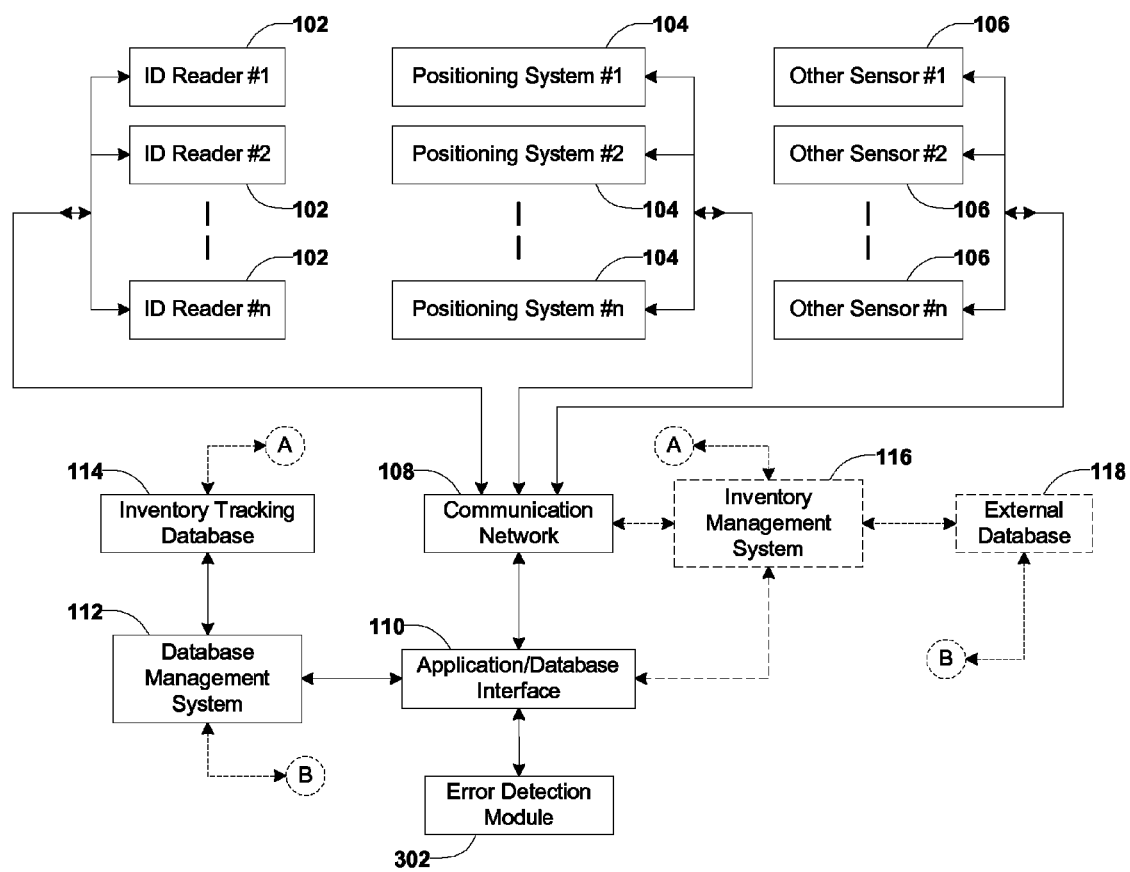
FIG. 3 shows a block diagram of a first embodiment of an inventory tracking and management system with automatic inventory error detection.

FIG. 3 shows a block diagram of an inventory tracking and management system with automatic inventory error detection components included according to embodiments of the present invention. In addition to the components in a typical inventory tracking and management system as shown in FIG. 1, the system further includes an Error Detection Module 302 that examines the validity of inventory data and automatically detects errors in the inventory tracking database 114. Although manual intervention is not necessary in the automatic error detection process, the Error Detection Module 302 can allow operators to manually intervene in the error detection process if the operators so desire. Details of the Error Detection Module 302 will be described later with respect to FIGS. 6 to 13.

Figure 4:
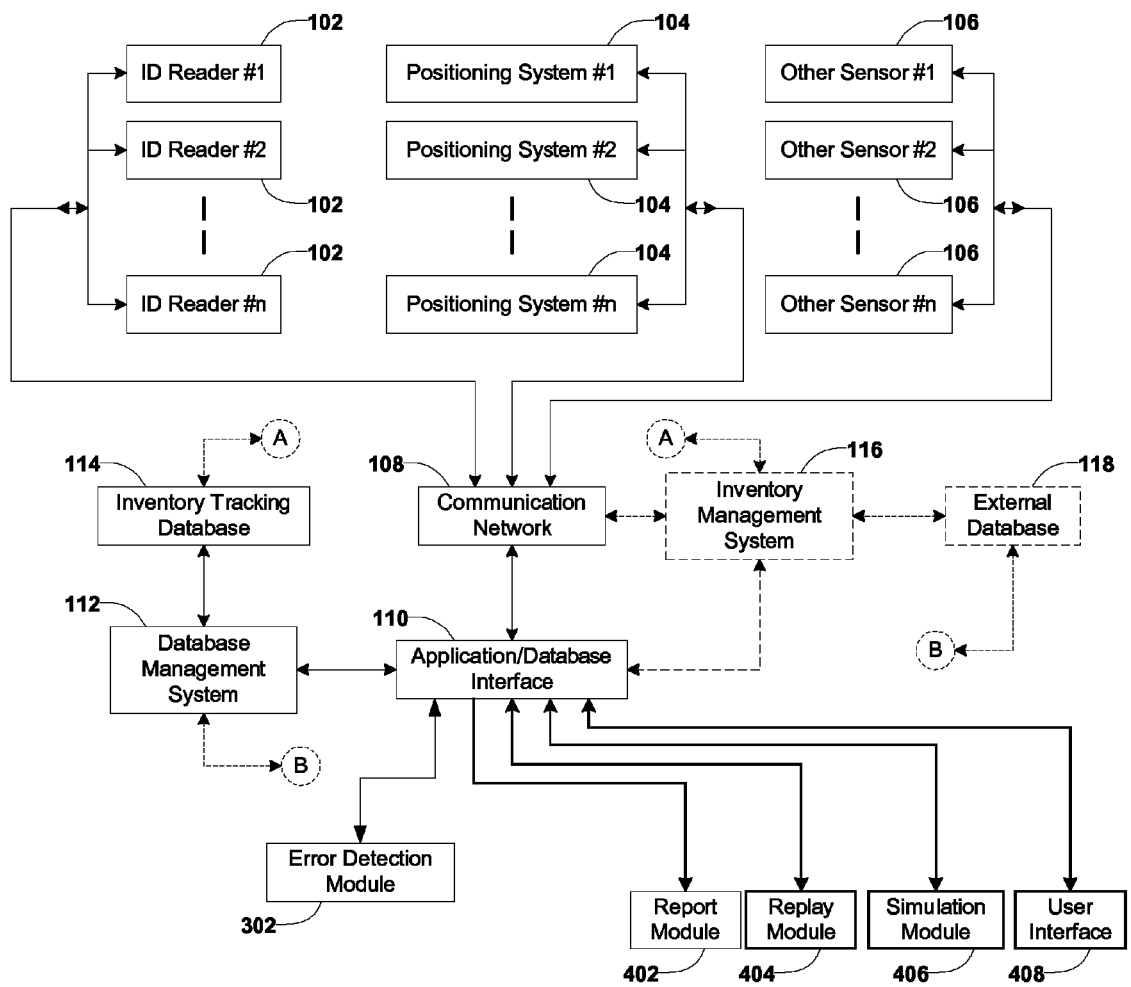
FIG. 4 is a block diagram for a second embodiment of the inventory tracking and management system with automatic inventory error detection, wherein the system further includes a Report module, a Replay module, a Simulation module, and User Interface(s).

FIG. 4 is a block diagram of another embodiment of components of the inventory tracking and management system according to the present invention. In this embodiment, the system includes the components shown in FIG. 1, as well as the Error Detection Module 302 of FIG. 3. Furthermore, the system includes the following: a Report Module 402, a Replay Module 404, a Simulation Module 406, and a User Interface 408. The Report Module 402 provides users the ability to query the system for particular information and historical data. The Replay Module 404 allows users to select a particular segment in time, a particular vehicle or group of vehicles, a particular shipping container, or other select criteria and have that segment of time "replayed" on a graphical user interface (GUI) (which is part of the User Interface 408) for the purpose of visually following the history of events, which may also facilitate manual evaluation and verification of the results from the automated error detection. The Simulation Module 406 allows users to manually input variable data elements via the User Interface 408 in a "simulation" mode, which would assist users to better understand the effects of various operation sequences and allow users to manually correct the detected errors by trial and error with operations preceding the occurrence of the errors. The User Interface 408 may be a graphical user interface and one or more input/output device(s), including but not limited to keyboards, printers, mice, or other local or remote input/output device(s).

Figure 5A:
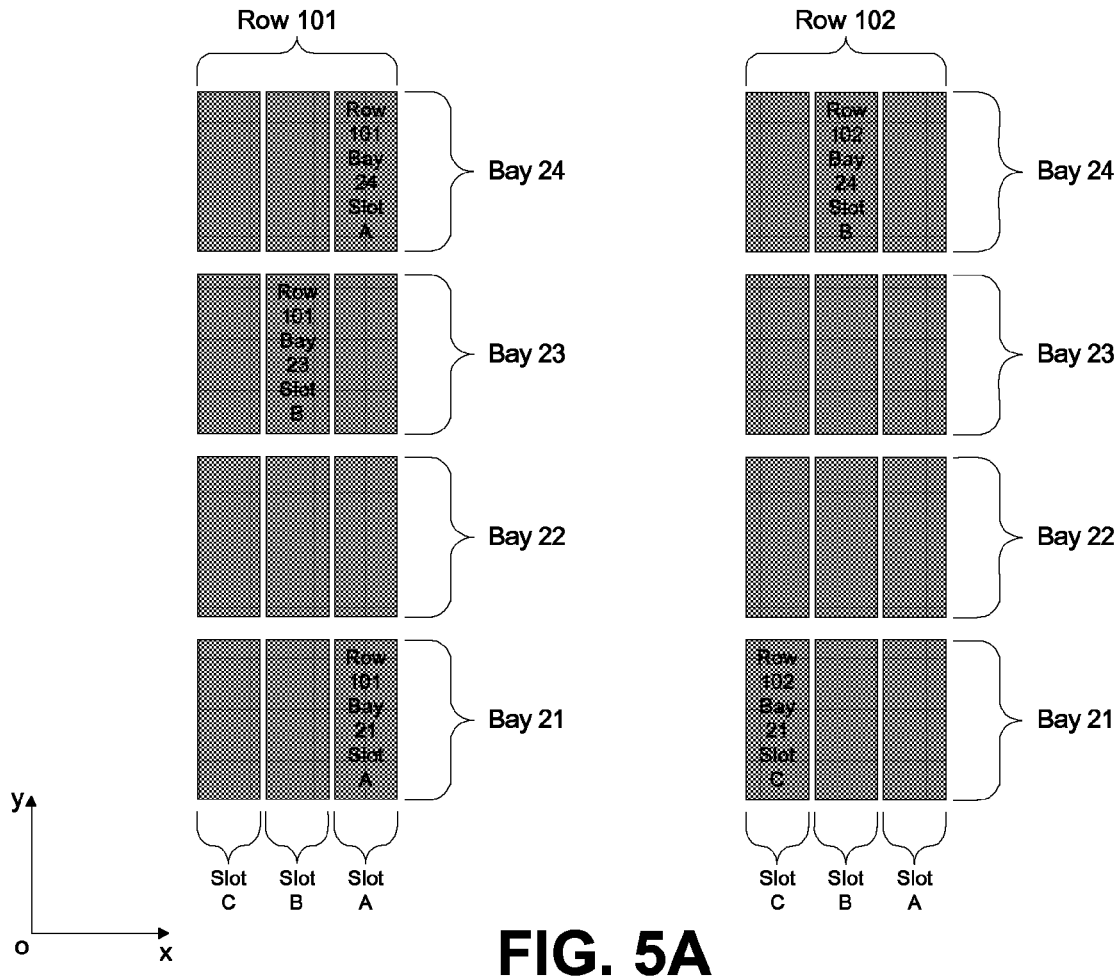
Figure 5B:
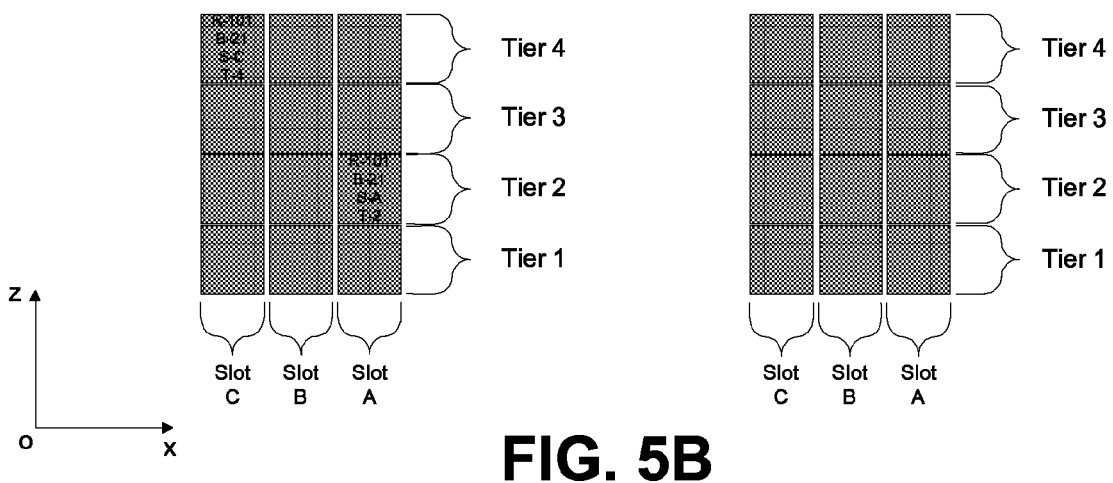
FIG. 5B shows an end view of rows of container stacks in a container shipping yard, where the container cell locations are labeled with an exemplary Container Cell Naming Convention.

FIGS. 5A and 5B show an exemplary layout of a container storage facility, at either a seaport terminal, a rail intermodal terminal, or an inland storage terminal. A Top View (FIG. 5A) and an End View (FIG. 5B) are included to illustrate the three-dimensional characteristics of the storage locations at a storage facility (terminal). Each individual rectangular block represents a container storage location where a container can reside. To uniquely identify each container storage location in the container storage facility, location naming conventions are usually used. FIGS. 5A and 5B show a typical location naming convention, which uses terms such as Row, Slot, Bay, and Tier. In this naming convention, a Slot value and a Bay value are used to uniquely identify a container storage location's planetary position in the container storage facility. Each bay has the width of one container's length and each slot has the width of one container's depth. Typically, several Slots (3 Slots in the example shown in FIG. 4) are grouped together to form a Row, and the distance between Rows is kept much larger than that between Slots in a Row so as to allow enough space for an HE to maneuver through. Containers can also be stacked on top of one another, and the height of the container storage location is represented by a Tier value. In the Top View (FIG. 5A), the container storage location in the far lower right corner of Row 101 is represented as (Row 101, Bay 21, Slot A) for its planetary position. In the End View (FIG. 5B), the height is shown and the container cell on the second tier of location (Row 101, Bay 21, Slot A) is uniquely identified by (Row 101, Bay 21, Slot A, Tier 2). Such a cell-naming convention allows quick and easy identification of a storage location for containers as well as numerous other types of inventory. Other naming conventions can also be used, and they all reflect uniformity throughout the storage facility in representing the three-dimensional storage cell locations.

The naming conventions typically identify the logical position of each container storage location, which may not be readily measured; for example, a GPS-based positioning system provides longitudinal, lateral and altitude positions in earth coordinates based on the pseudo-range (the distance between the satellite and the antenna) measurements from the GPS receiver. To facilitate the association of the positions from the positioning system with the logical positions represented in the naming conventions, the positioning system further transforms its position measurements in earth coordinates to positions in local Cartesian coordinates (x, y, z) as shown in FIGS. 5A and 5B. Subsequently, a conversion table is typically used to associate the Cartesian positions (i.e., positions in the local Cartesian coordinates) with the logical position of the container cell. An exemplary conversion table is shown below in Table 1, where the Cartesian positions correspond to the Cartesian positions of the center of the container cell. Alternatively, other types of coordinates (such as polar coordinates) can be used and accordingly, conversion tables that associate the logical locations to cell locations in the chosen coordinates are used.

TABLE 1

Exemplary Conversion Table

| Logical location | Cartesian positions (of the center of the cell location) |
| --- | --- |
| Row 101, Bay 24, Slot A, Tier 1 | x1, y1, z1 |
| Row 101, Bay 24, Slot A, Tier 2 | x1, y1, z2 |
| ... | ... |
| Row 101, Bay 22, Slot A, Tier 1 | x1, y2, z1 |
| ... | ... |
| Row 102, Bay 24, Slot C, Tier 4 | x2, y1, z4 |
| ... | ... |

Notice that given the local coordinate (x, y, z) as shown in FIGS. 5A and 5B, container cells that are in the same Slot of a Row share the same value in x coordinate, container cells that are in the same Bay share the same value in y coordinate, and container cells that are in the same Tier share the same value in z coordinate. The container storage facility and the naming convention described above together with FIGS. 5A and 5B will be used to help describe the process in the Error Detection Module 302. However, the Error Detection Module 302 can work with other naming conventions.

Figure 6:
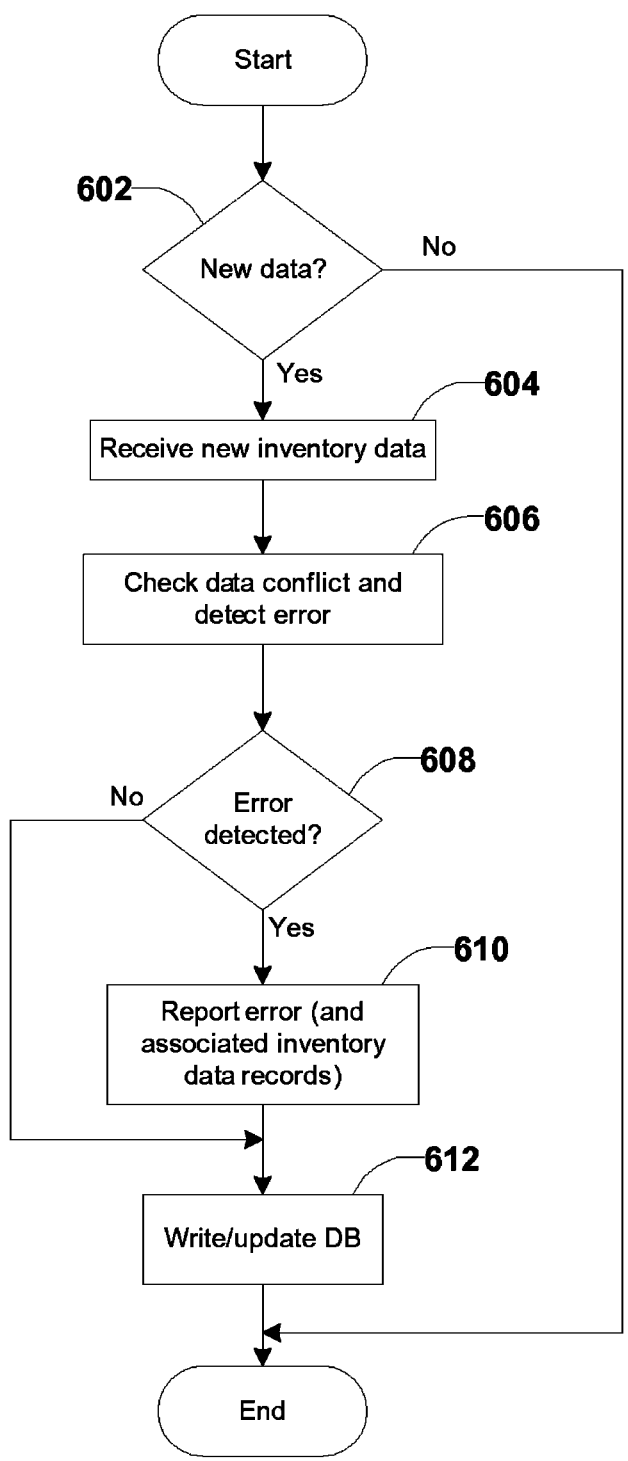
FIG. 6 is a flowchart showing the process involved in one embodiment of the error detection module 302.

FIG. 6 is a flowchart illustrating the basic operation of the Error Detection Module 302. The process starts with examining whether new data is available for processing at step 602. In one embodiment, the new data is provided by the inventory tracking system, e.g., it can be generated by the Application/Database Interface 110 based on the information it received from the ID readers 102, Positioning Systems 104, and Other Sensors 106 via Communication Network 108, as well as information from Inventory Management System 116. In an alternative embodiment, the new data can be data records input by an operator through an input means including keyboards, mice, touch screens, and so on. The new data can also be provided by any computer program that generates data records, e.g., any application or service that requests and retrieves data from the Inventory Tracking Database 114. Examples of such applications include validity check programs, simulation tools, replay tools, and so on.

This new data includes at least one data field containing position-related information, which can be either a position of an HE, a position of a container inventory, or a container cell location. The new data should also include sensor information for identifying an event associated with the new data or directly include a data field that specifies the event. The new data can further include data fields containing some of the following information: a time stamp associated with this data, the ID and type of the HE the data is associated with, the movement information of the HE (e.g., speed), the ID and type of the container being operated by the HE, the type of the operation, the confidence level of this data, and so on. For example, the new data may indicate a container with ID as Container A has been picked up at a container cell location (e.g., Row 101, Bay 21, Slot A, Tier 2).

If no new data is available, the Error Detection Module 302 exits the process and waits until the next process cycle to re-enter the process, which will again start with checking for the availability of new data at step 602. If new data is available, the Error Detection Module reads the new data at step 604. At step 606, the Error Detection Module then examines the new data received at step 604 together with the corresponding inventory data it requested from the Inventory Tracking Database for their consistency, so as to detect data conflicts/errors. The detailed data conflict detection process involved in step 606 is described later with respect to FIGS. 7 to 13.

The output of step 606 includes at least one variable indicating whether or not data conflicts/errors have been detected; such variables are used in step 608 to determine the subsequent process. If errors are detected, the Error Detection Module 302 continues to step 610 to report the error back to the Application/Database Interface 110, which can further report the error to users (e.g., through User Interface 408). In other embodiments, the Error Detection Module reports the error to an inventory management system associated with the inventory tracking system, or an output means for displaying the erroneous data records to an operator, or a computer program that is configured to receive the erroneous data records. The Error Detection Module may also request operators to manually correct the errors or it may initiate an automatic error correction process if available. After reporting the error or if no error has been detected, the Error Detection Module continues to step 612 to write/update the Inventory Tracking Database 114 with the (updated) inventory data. In one embodiment, the Error Detection Module also creates tables in the Inventory Tracking Database 114 and the erroneous data records to the tables upon the detection of data errors; thus, the erroneous data records are collected in these tables for easy access by an operator or a computer program. Alternatively, the Error Detection Module 302 may create log data to record additional results generated during the data conflict detection process (step 606) and write such log data into the Inventory Tracking Database 114. The Error Detection Module 302 then exits the process and waits until the next process cycle to repeat the process.

Figure 7:
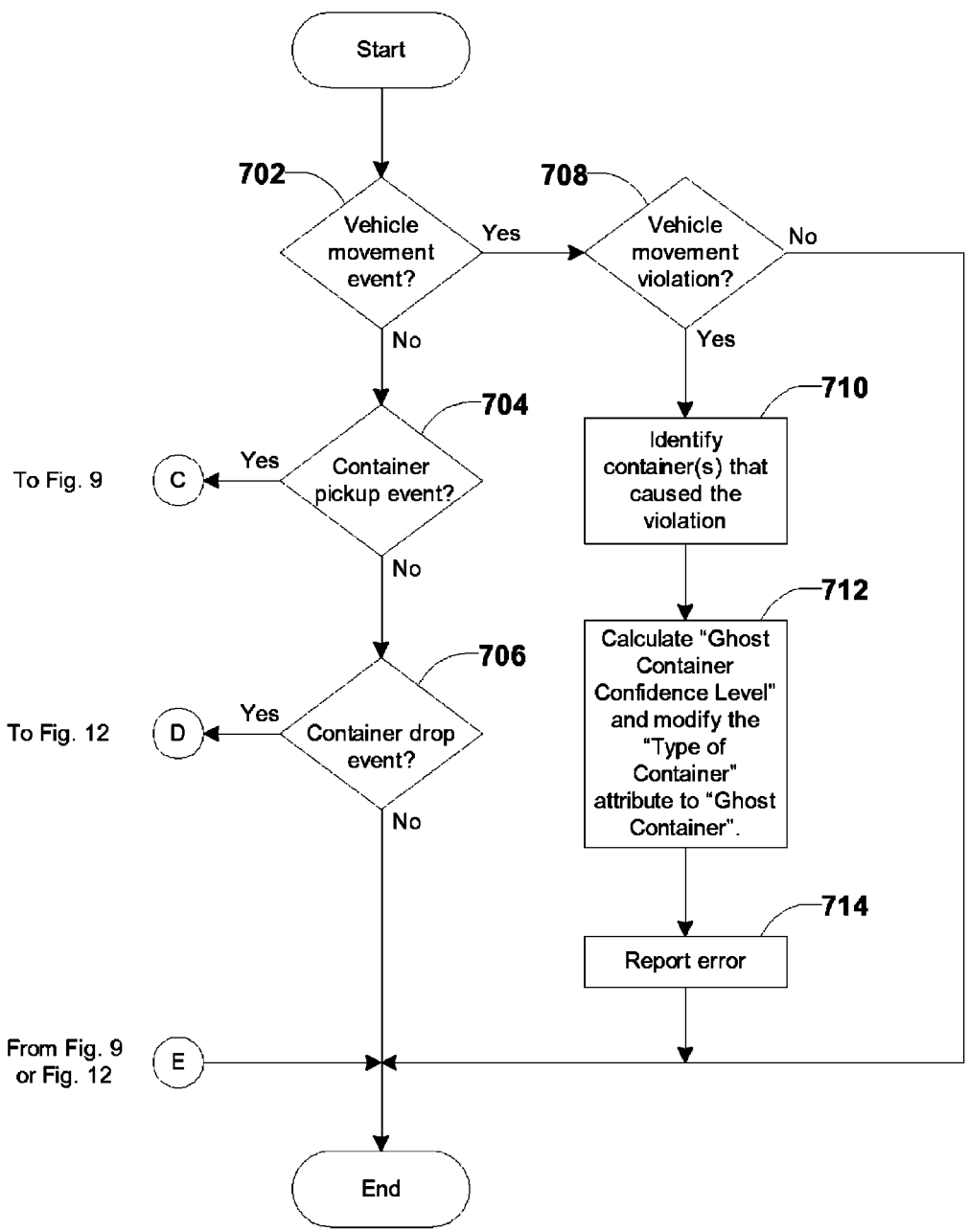
FIG. 7 is a flowchart showing the detection of inventory errors according to the types of events that have occurred, wherein the types of events include vehicle movement events, container pickup events, and container drop events.

FIG. 7 is a flowchart illustrating one embodiment of the data conflict detection process involved in step 606, where the Error Detection Module 302 compares the new inventory data with the corresponding inventory data from the Inventory Tracking Database 114 to detect data conflicts and, upon the detection of a data conflict, further determines the type of the data conflict and the container(s) that caused the data conflict, calculates confidence levels and indexes, and re-assigns attributes to relevant containers.

In this embodiment, different detection procedures are used to detect data conflicts based on the event associated with the new data. The data conflict detection process first identifies this event from a pre-defined set of events based on the new data. The pre-defined set of events represents operations associated with the inventories and HE. The operations can include the following: container pickup operations where a container inventory is picked up, container drop-off operations where a container inventory is set down, and vehicle movement operations where an HE is moving. Accordingly, the pre-defined set of events includes the following: vehicle movement events (i.e., the HE is moving with a speed larger than a pre-set threshold such as 0.1 m/s), container pickup events (i.e., the HE has just picked up a container), and container drop events (i.e., the HE has just dropped off a container).

Initially in FIG. 7, the data conflict detection process identifies which type of the pre-defined events has occurred in steps 702, 704 and 706. In one embodiment, the new inventory data includes a field (e.g., an "event" field) directly specifying the associated event; for example, a value '0' indicates a vehicle movement event, a value "1" indicates a container pickup event, a value "2" indicates a container drop event, and so on. Correspondingly, the value in the "event" field is examined at step 702 and a vehicle movement event is detected if the value is equal to 0. If the value is not 0, the process continues to step 704 to determine whether a container pickup event has occurred. If the value in the "event" field is equal to 1, a container pickup event is detected; otherwise, the process continues to step 706 to determine whether a container drop event has occurred by examining if the value in the "event" field is equal to 2.

Besides the "0", "1", or "2" stored in an inventory data field, in another embodiment, the new inventory data can include a field containing the speed of the HE. If the speed is larger than a pre-set threshold, a vehicle movement event is detected; otherwise, the new inventory data does not indicate a vehicle movement event. Further, the new inventory data can include the output from a field containing sensor (e.g., a twist-lock sensor) or other information that indicates a pickup or drop event. For example, when a container is being picked up, the twist-lock sensor on the HE changes from "unlocked" to "locked," and when a container is being dropped off, the twist-lock sensor changes from "locked" to "unlocked." Therefore, in this embodiment, the new inventory data includes information of the change in the twist-lock status and the process examines this information to identify the associated event (pickup or drop event) at steps 704 and 706.

Figure 9:
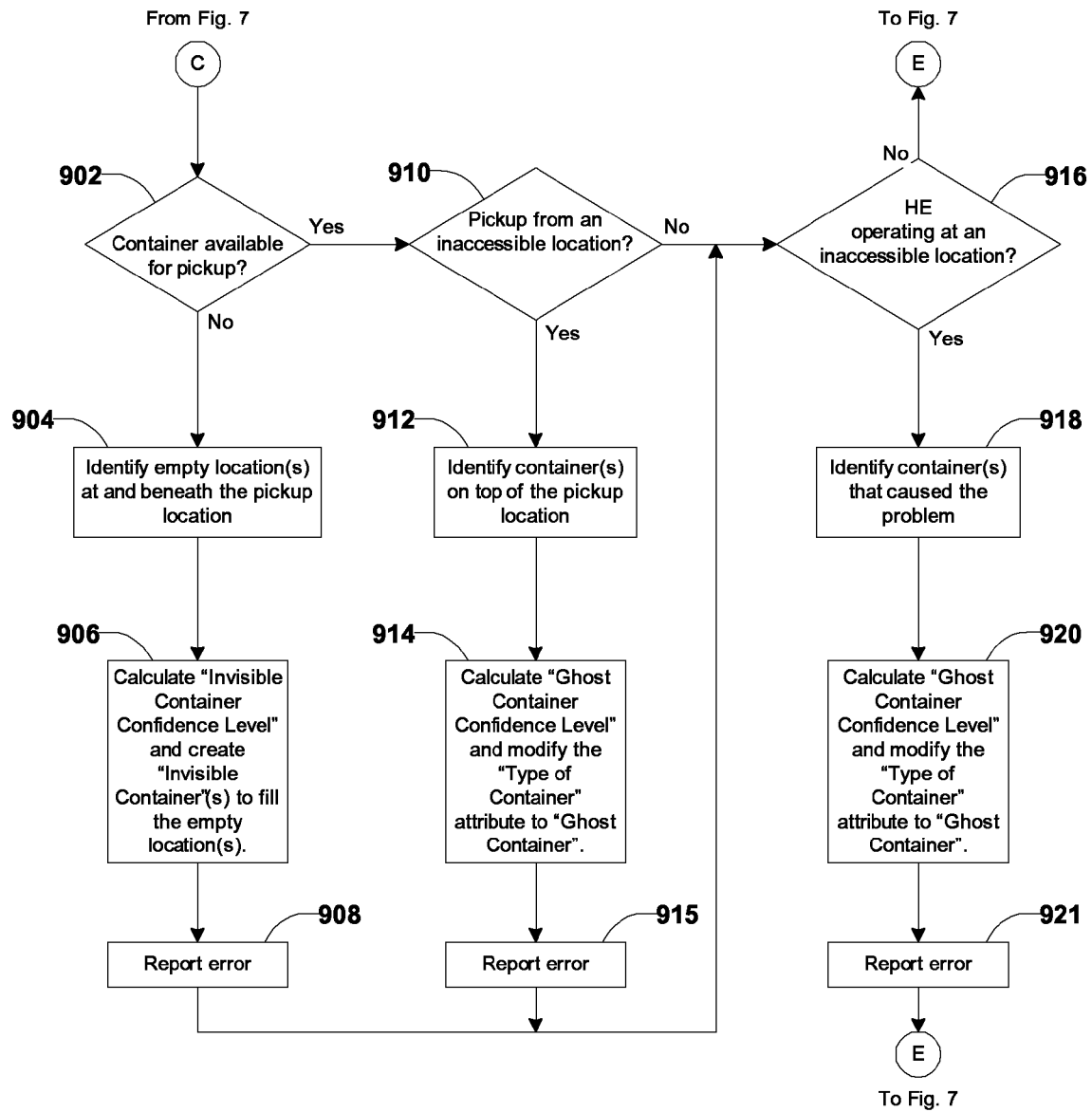
FIG. 9 is a flowchart showing the process of detecting inventory errors when a container pickup event occurs.

If a container pickup event is detected at step 704, the process continues to steps 902 through 920 in FIG. 9. If instead a container drop event is detected at step 706, the process continues to steps 1202 through 1220 in FIG. 12. If none of the events are detected, this data conflict detection process (which corresponds to the process in block 606) ends after step 706 without reporting any error.

If a vehicle movement event is detected at step 702, the process continues to steps 708 through 714 for data conflict detection. Steps 708 through 714 show the data conflict detection process when a vehicle movement event has been detected at step 702. To help explain the process, two examples of vehicle movement events are provided in FIGS. 8A and 8B that will be described after the description of steps 708 through 714. According to the identified event, the data conflict detection then provides a list of possible error types and employs an error checking process to go through these error types in the list to determine whether an error of the specified error types has occurred. In one embodiment, the list of possible error types corresponding to a vehicle movement event includes movement violation, which can mean the HE is moving at locations that are already occupied by containers according to the inventory database. Since a movement violation is the only error type in the list of error types for vehicle movement events, the error checking process (at step 708) just needs to determine if the movement violation has occurred.

For step 708, the data conflict detection process uses the following procedure for detecting movement violations:

(1) The data conflict detection process first determines a search criterion based on the error type (here, a movement violation) and the new data; more specifically, the process identifies container cell location(s) (i.e., Row, Bay, and Slot values) that corresponds to the position in the new data (with consideration of the dimension of the HE) based on the location-position association described earlier (see Table 1 and the location naming convention in FIGS. 5A and 5B).

(2) If no container cell location is identified, the position is not a container cell location (e.g., the HE is moving along an aisle between two rows), and the data conflict detection process determines that no moving violation has occurred.

(3) If container cell locations are identified, these cell locations constitute the search criterion and the process then queries the inventory database for inventory data corresponding to the identified cell locations. If the query results (i.e., inventory data records) indicate there is a container where one should not be or there are multiple containers at the identified single cell location, the data conflict detection process concludes and reports that a movement violation error has occurred. Otherwise, the data conflict detection process reports that no movement violation has occurred.

After step 708, the process can return directly to steps 608 through 612 to report error or no error depending on the detection at step 708. Alternatively, if a movement violation is detected at step 708, the process can further identify and modify the erroneous data records that are affected by the detected error as shown at steps 710 through 714 in FIG. 7.

At step 710, the data conflict detection process reads the data records in the query results, identifies among them the data records that show the cell locations are occupied, and determines these data records as erroneous inventory data records. Since an HE cannot move through an occupied cell location in reality, a movement violation indicates either the position data in the new inventory data is wrong (i.e., the HE is actually not at the position reported in the new inventory data), or the corresponding inventory data that shows that the cell location is occupied is erroneous (i.e., there is actually no container at the location). In the embodiment shown in FIG. 7, the data conflict detection process always trusts the position data in the new inventory data. Thus, the inventory data that shows that the cell location is occupied is always regarded as erroneous.

At step 712, the data conflict detection process further modifies each of the erroneous inventory data records to indicate an error has occurred. In one embodiment, the modification includes changing an attribute field (referred to as "Type of Container" for description purposes) in an erroneous inventory data record, e.g., to "Ghost Container," to indicate that the container is a "ghost" in the Inventory Tracking Database 114 and that it does not actually occupy the cell location. The data conflict detection process also modifies the new data, e.g., by adding an error flag to the new data, to indicate that the corresponding movement event causes a movement violation error, thereby the process regards the new data as erroneous data records as well. Such modification facilitates the subsequent error correction process (either manual or automatic) by distinguishing these containers and the corresponding data records from "normal" containers and their records, where no errors have been found. If the subsequent error correction process determines that these containers are actually at the specified location and the new data is actually erroneous, it can delete "Ghost Container" or replace it with normal properties in the "Type of Container" data field.

The modification can further include calculating a confidence level, $Conf_{err}$, to indicate to what level of confidence the containers in the erroneous data records are indeed ghost containers. Such a confidence level is usually calculated as a function of $Conf_{pos}$, the confidence of the position data of the HE provided in the new inventory data: $Conf_{err}=f(Conf_{pos})$. In a simplest embodiment, the confidence level is set to be the confidence of the position data in one embodiment: $Conf_{err}=Conf_{pos}$. Alternatively, the calculation can also use the confidence level ($Conf_{drop}$) in the erroneous data records, which is the confidence level of the drop event of that container: $Conf_{err}=f(Conf_{pos}, Conf_{drop})$. For example, $$Conf_{err} = \frac{Conf_{pos} \times (1 - Conf_{drop})}{Conf_{pos} \times (1 - Conf_{drop}) + (1 - Conf_{pos}) \times Conf_{drop}}$$

After step 712, the data conflict detection process then reports the data conflict as an error (e.g., by setting an error flag to 1) in step 714; the data conflict detection process can further output information such as the modified erroneous inventory data records, the type of error (i.e., ghost containers), and the type of event (i.e., vehicle movement event) at step 714. This information can then be used in the subsequent error reporting process at step 610 in FIG. 6.

Figures 8A, 8B:
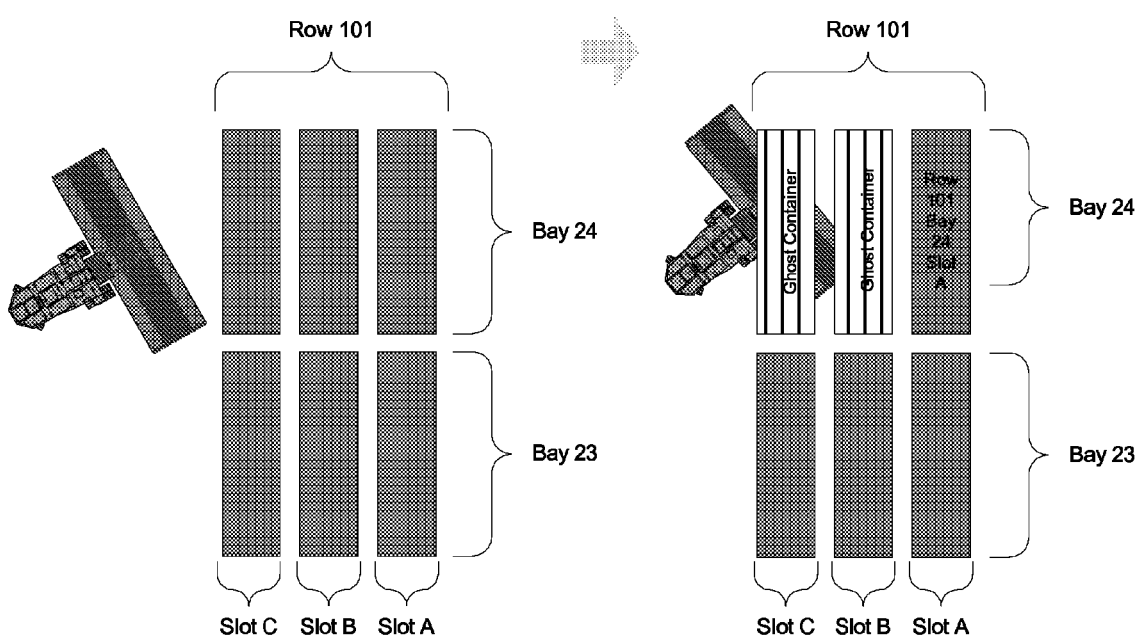
FIGS. 8A and 8B illustrate examples of vehicle movement violation and the corresponding inventory error.

To further explain the data conflict detection process shown in FIG. 7, two examples of vehicle movement events are provided in FIGS. 8A and 8B. In the first example shown in FIG. 8A, an HE is approaching the containers in Row 101 according to the positioning system(s) onboard the HE. The sensor information is transmitted periodically via the Communication Network 108 to report the HE's status to the Application/Database Interface 110. Such sensor information can include the position of the HE, the confidence of the position, the speed of the HE, the event associated with the HE, and so on. The Application/Database Interface 110 then generates new inventory data as it deems necessary to write into the Inventory Tracking Database 114 through the Database Management System 112. Meanwhile, the Application/Database Interface 110 also forwards the generated new inventory data to the Error Detection Module 302 for error detection. (Alternatively, the Application/Database Interface may wait until it receives confirmation from the Error Detection Module 302 before it writes the new inventory data to the Inventory Tracking Database 114.) At the time instance corresponding to the first example, the new inventory data indicates the position of the HE as (x, y, z) and the speed as vx, which is greater than 0.1 m/s indicating the container is moving.

As described with FIG. 6, since the speed of the HE is greater than the threshold (e.g., 0.1 m/s), the Error Detection Module determines that the new inventory data indicates a vehicle movement event at step 702. The Error Detection Module then determines whether a moving violation for the HE at its location next to Row 101, Bay 24 has occurred at step 704. To do that, the data conflict detection process first identifies the cell location (i.e., a Row value, a Bay value, and a Slot value) that corresponds to the position in the new inventory data (px, py, pz). Since the HE is a physical entity with dimensions while the position (px, py, pz) typically corresponds to a point on the HE (e.g., the mount location of the GPS receiver onboard the HE), the planetary position (px, py) is usually converted to an area that represents the planetary area the HE occupies. In one embodiment, upper and lower bounds at x and y coordinates are used and the planetary area is represented by ([px−xb1, px+xb2], [py−yb1, py+yb2]), where xb1 and yb1 are the lower bounds and xb2 and yb2 are the upper bounds. The upper and lower bounds can vary depending on factors such as the type of the HE and whether the HE is loaded with a container or not, and the physical dimensions of the container. The data conflict detection process then searches the Cartesian positions in the conversion table (e.g., Table 1), for any Cartesian positions (x, y, z) that satisfies $$px-xb1-(width/2) \leq x \leq px+xb2+(width/2), \text{ and}$$

$$py-yb1-(length/2) \leq y \leq py+yb2+(length/2),$$

where width, length, and height are the width, length, and height of a cell location. In this specific example shown in FIG. 8A, the search yields no results since the area ([px−xb1, px+xb2], [py−yb1, py+yb2]) does not correspond to a valid cell location, as the HE is spaced apart from any containers in Row 101, Bay 24. Accordingly, the data conflict detection process concludes that no moving violation occurs at step 708 and exits to step 608 without reporting any error. Subsequently, the process continues to step 612 to update the database.

Assume the HE continues moving and is now at the position shown in FIG. 8B, which is within the area of containers in Row 101, Bay 24. A new inventory data record generated at this time instance now includes the new position (px, py, pz) and a new speed vx that is also larger than the pre-set threshold, indicating the HE is moving. Again, the Error Detection Module 302 determines that a vehicle moving event has occurred at step 702. The Error Detection Module then follows the three-step procedure to determine whether a moving violation has occurred: (1) the process searches the Cartesian positions in the conversion table (e.g., Table 1), for the corresponding cell location, (2) the search now results in (Row 101, Bay 24, Slot C, Tier 1 to Tier 4) and (Row 101, Bay 24, Slot B, Tier 1 to Tier 4), and (3) the process then queries the Inventory Tracking Database 114 for inventory data corresponding to those cell locations (Row 101, Bay 24, Slot C, Tier 1 to Tier 4) and (Row 101, Bay 24, Slot B, Tier 1 to Tier 4).

If the Inventory Tracking Database 114 does not include any records showing containers at the specified cell locations, the query will return no results, or in some Inventory Tracking Systems the query will return records indicating the locations are unoccupied. The Error Detection Module 302 then concludes that no movement violation occurs and exits to step 608 with no error reported. If the Inventory Tracking Database 114 had data records showing there are two containers located at the specified cell locations, for example, Container A at (Row 101, Bay 24, Slot C, Tier 1) and Container B at (Row 101, Bay 24, Slot B, Tier 1), the query will yield the corresponding two inventory data records. According to the query results, the Error Detection Module 302 concludes that there are containers there and therefore a movement violation has occurred. The Error Detection Module 302 then reads the two inventory data records at step 710 for further processing. Subsequently at step 712, the Error Detection Module 302 changes the two inventory data records to mark each of the Containers A and B. e.g., as "Ghost Container," and updates their confidence level based on the confidence level of the position provided in the new inventory data. Errors (together with the two modified data records) are then reported (e.g., by setting an error flag to 1) at step 714, and the Error Detection Module proceeds to steps 608 through 612.

Referring back to FIG. 7, if, at step 704, it is determined that a container pickup event has occurred, the data conflict detection process continues to steps 902 through 920 in FIG. 9, which shows the process to detect errors when a container pickup event occurs. The data conflict detection process first provides a list of error types that corresponds to the container pickup event. In the embodiment shown in FIG. 9, the list of error types includes three error types: no container available for pickup, inaccessible pickup location, and inaccessible operating location. The data conflict detection process then employs a checking process to examine whether an error of one of the three error types has occurred.

At step 902, the data conflict detection process first determines whether there was a container available for pickup at the location specified by the new inventory data. The determination is conducted in three sub-steps: (1) the process determines a search criterion by identifying the pickup location based on the position data (including the height) or the cell location in the new inventory data (this pickup location then constitutes the search criterion); (2) the process then uses the determined search criterion to query the Inventory Tracking Database 114 for inventory data records corresponding to the determined pickup location; and (3) the process determines that no container is available if the query returns no result or results that indicate the location is unoccupied; otherwise, the process determines that the container is available.

If no container is available for pickup at the specified pickup location as determined in step 902, the process can proceed directly to step 908 to report the error with the error type and then proceed to the next error checking step at step 916 to determine whether the HE is operating at an inaccessible location. In another embodiment, the process continues to steps 904 and 906 to identify and modify the erroneous data records. At step 904, the data conflict detection process identifies unoccupied cell location(s) beneath the pickup location by further query of the Inventory Tracking Database 114 for inventory data records corresponding to the cell location(s) beneath the pickup location.

For the new data to be correct, the cell location corresponding to the new data as well as the cell location(s) beneath it must have been occupied before the pickup event. The absence of these containers indicates an error either in the Inventory Tracking Database 114 or in the new data.

Next in step 906, to enhance the integrity of the Inventory Tracking Database 114, the data conflict detection process then creates inventory data records to reflect the occupancy of those cell locations determined in step 904. The data conflict detection process further marks these containers, e.g., as "Invisible Containers," to distinguish them from "normal" containers where no errors have been found. Also at step 906, the data conflict detection process further calculates the confidence level (i.e., the "Invisible Container Confidence Level") for these "invisible" containers. The calculation of the confidence level follows similar formulas as those used in step 712 and is based on the confidence level provided in the new inventory data. In addition, the data conflict detection process also marks the new data as erroneous since it can be wrong as well. In one embodiment, this involves adding an error flag to the new data to indicate the error as well as the error type.

The data conflict detection process then proceeds to step 908 to report the error, as well as the type of error, the unoccupied cell locations, and the newly created inventory data records for the "invisible container(s)". Subsequently, the process proceeds to the next error checking step at step 916 to determine whether the HE is operating at an inaccessible location.

Figure 10A:
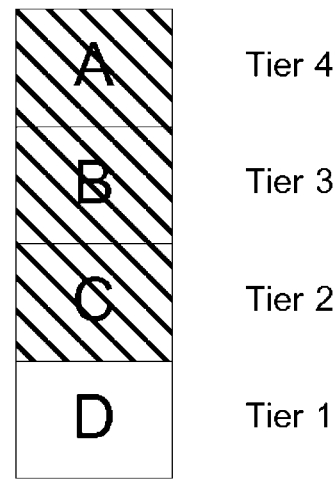
FIGS. 10A and 10B illustrate examples of inventory errors when container pickup events occur.

FIG. 10A illustrates an example where a container was not available for pickup as might be detected in steps 902-908. In this example, the Inventory Tracking Database indicates that there is only Container D at Tier 1 of a specific location while the new inventory data reports that Container A has been picked up at Tier 4 of the specific location. Correspondingly, after the Error Detection Module 302 reads the new inventory data at steps 604, the Error Detection Module enters the data conflict detection process at step 606 as shown in FIG. 7. Going through steps 702 and 704, the Error Detection Module determines that a container pickup event has occurred, and then checks whether the container was available for pickup at step 902. As only Container D exists in the Inventory Tracking Database, the query on Tier 4 of the location returns no result, which leads to the conclusion that no container was available for pickup. At step 904, the Error Detection Module 302 then queries on Tier 1 through Tier 3 of the location, and the result will include only one inventory data record showing that Container D is at Tier 1 of the location. Thus, according to the Inventory Tracking Database, Tiers 2, 3, and 4 of the location are empty; however, according to the new data, Tiers 2, 3, and 4 of the location should have been occupied. Accordingly, at step 906, the Error Detection Module 302 creates three inventory data records, with cell locations at Tier 2, 3, and 4 respectively, and the "Type of Container" of these records is marked, e.g., as "Invisible Container." Since the container at Tier 4 has been picked up according to the new data, the Error Detection Module 302 further marks the newly created data records corresponding to this pickup location, e.g., as "expired," to indicate it is only valid in the past. Alternatively, the Error Detection Module 302 can just create inventory data records for the cell locations at Tiers 2 and 3. In addition, the new data is also marked due to the data conflict, since it can potentially be incorrect as well. In one embodiment, the new data is marked by adding an error flag for the error detected.

The Error Detection Module 302 may further assign the confidence level of the pickup event given in the new inventory data or a function of this confidence level to be the confidence level of the newly created inventory data records. Subsequently, the data conflict detection process reports the errors as well as the newly created data records at step 908 and then proceeds to the next error checking step to determine whether the HE is operating at an inaccessible location at step 916.

Figure 10B:
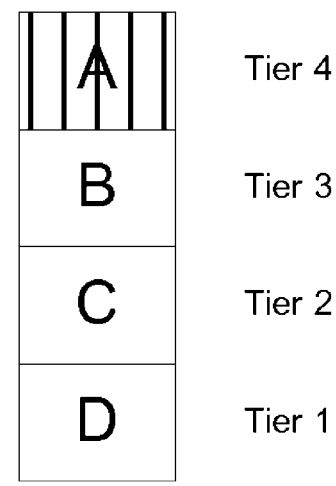

Referring back to FIG. 9 and proceeding to step 910, if it is determined that a container was available for pickup in step 902, the data conflict detection process then goes to the next error checking step to determine whether an error of the type, inaccessible pickup location has occurred at step 910. That is, the data conflict detect process determines if the container was picked up at an inaccessible location at step 910. An example is shown in FIG. 10B, where the new inventory data indicates that Container B has been picked up from Tier 3 but the Inventory Tracking Database shows that Container A is stacked above Container B at Tier 4. Due to the existence of Container A on top of Container B in the Inventory Tracking Database, Container B should actually have been inaccessible unless Container A had been picked up first. To determine whether the container picked up was at an inaccessible location, the data conflict detection process first determines a search criterion by checking if the pickup location is at the top tier, i.e., Tier 4 in this exemplary storage facility. If yes, the pickup location is deemed accessible and no search criterion and no query are needed; therefore, the process continues to step 916. Otherwise, the cell locations above the pickup location constitute the search criterion and the data conflict detection process further uses this search criterion to query the Inventory Tracking Database 114 for inventory data records that are associated with the cell locations above the pickup location. If the query returns no results or results indicating that no containers are above the pickup location, the data conflict detection process concludes that the pickup location is accessible and proceeds to the next error checking step at step 916. For the example shown in FIG. 10B, the query is on Tier 4 of the specific location since the pickup location is at Tier 3. In this example, the query will return an inventory data record showing Container A is at Tier 4; therefore, the data conflict detection process determines that the pickup location should not have been accessible at step 910 and concludes that an error of the type, inaccessible pickup location, has occurred. The process can then proceed to report the error together with the type of the error at step 915. Alternatively, the process can further identify and modify the erroneous data records at steps 912 and 914 before going to step 908.

Processing in one embodiment can proceed from step 910 to report the data in step 915. In an alternative embodiment at step 912, the process reads the data records resulted from the query for further processing and proceeds to step 914 where the data conflict detection process then marks those containers, e.g., as "Ghost Container," in a field representing the type or property of the container in the inventory data record to indicate that they only exist in the Inventory Tracking Database. Furthermore, a confidence level, named the "Ghost Container Confidence Level," is also calculated at step 914 based on the confidence level provided in the new inventory data; this confidence level is then added to these inventory data records or replace the original confidence level in these inventory data records. The data conflict detection process also marks the new data to reflect the error; in one embodiment, this involves adding an error flag to the new data to indicate the error as well as the error type. Subsequently, the data conflict detection process reports the error in step 908 including the type of the error, and outputs the updated inventory data records.

Next, the data conflict detection process proceeds to step 916 to determine if the HE itself is operating at an inaccessible location. This step 916 occurs after the process steps (steps 902 through 908 and steps 910 through 914) associated with the previous two error types (i.e., no container available for pickup and inaccessible pickup location), since this third error type in step 916 is not mutually exclusive with the other two error types.

Figure 11A:
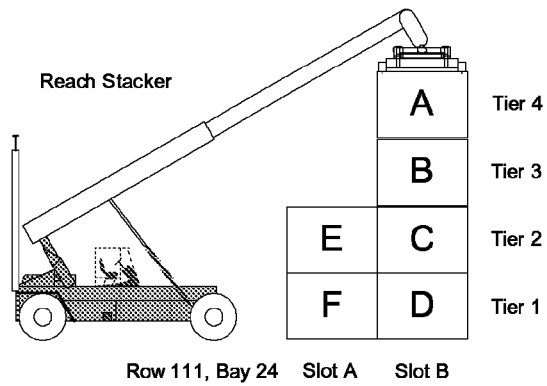
FIGS. 11A-11D illustrate examples of inventory errors when a container pickup event occurs.
Figure 11B:
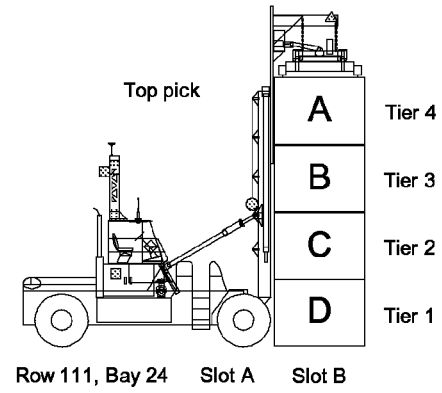
Figure 11C:
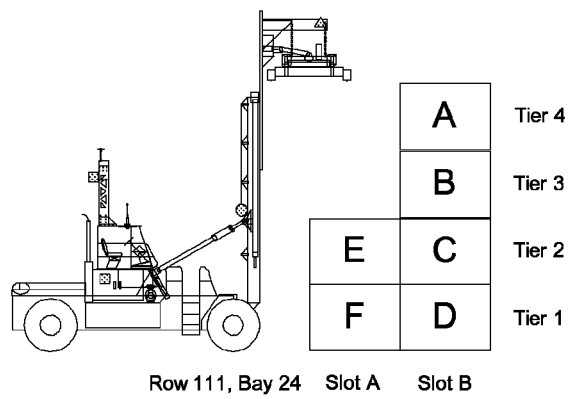
Figure 11D:
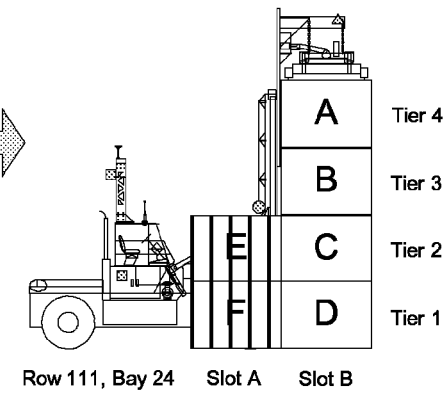

FIGS. 11A-11D show circumstances illustrating why HE can be in an inaccessible location, requiring steps 916-920. FIGS. 11A and 11B show two examples of HE operating at accessible locations, where the HEs can legitimately pick up Container A. However, FIGS. 11C and 11D show that due to the existence of Containers E and F, the HE, a top pick, does not have the access to Container A even though Container A can be accessed by a reach stacker (a different type of HE) as shown in FIG. 11A.

In one embodiment, in order to identify whether an HE is operating at an inaccessible location, a clearance area is defined for each type of HE. Such a clearance area can be represented by a rectangular area, a circular area, or an area with other shapes (depending on the shape of the HE) in an HE controller access area memory, with the location of the container being picked up as the reference point. Alternatively, the clearance area can be represented directly by cell locations with reference to the location of the container being picked up. The cell locations within this clearance area constitute the search criterion and the data conflict detection process uses this search criterion to query the Inventory Tracking Database 114 for inventory data corresponding to the locations in the clearance area. If the query yields no records or records that indicate no container in the clearance area, the HE is not operating at an inaccessible location as determined in step 916, and the data conflict detection process exits to step 608 without further reporting errors. However, if the query in step 916 yields results showing that there are containers at the cell locations in the clearance area, the data conflict detection process concludes that the HE is operating at an inaccessible location and proceeds to step 918 to read and receive those records for further processing; namely in step 918, any containers causing the inaccessibility problem are identified. Alternatively to proceeding with step 918, the data conflict detection process can bypass steps 918 and 920 and directly proceed to step 921 to report the error with the error type.

At step 920, the data conflict detection process then marks the containers, identified in step 918, e.g., as "Ghost Container," in a field representing the type or property of the container in these inventory data records to indicate that they only exist in the Inventory Tracking Database. Furthermore, a confidence level, named the "Ghost Container Confidence Level," is also calculated at step 920 based on the confidence level provided in the new inventory data; this confidence level is then added to these inventory data records or replaces the original confidence level in these inventory data records. Subsequently, the data conflict detection process reports the error in step 921 including the type of the error, outputs the updated inventory data records, and exits to steps 608 through 612.

Figure 12:
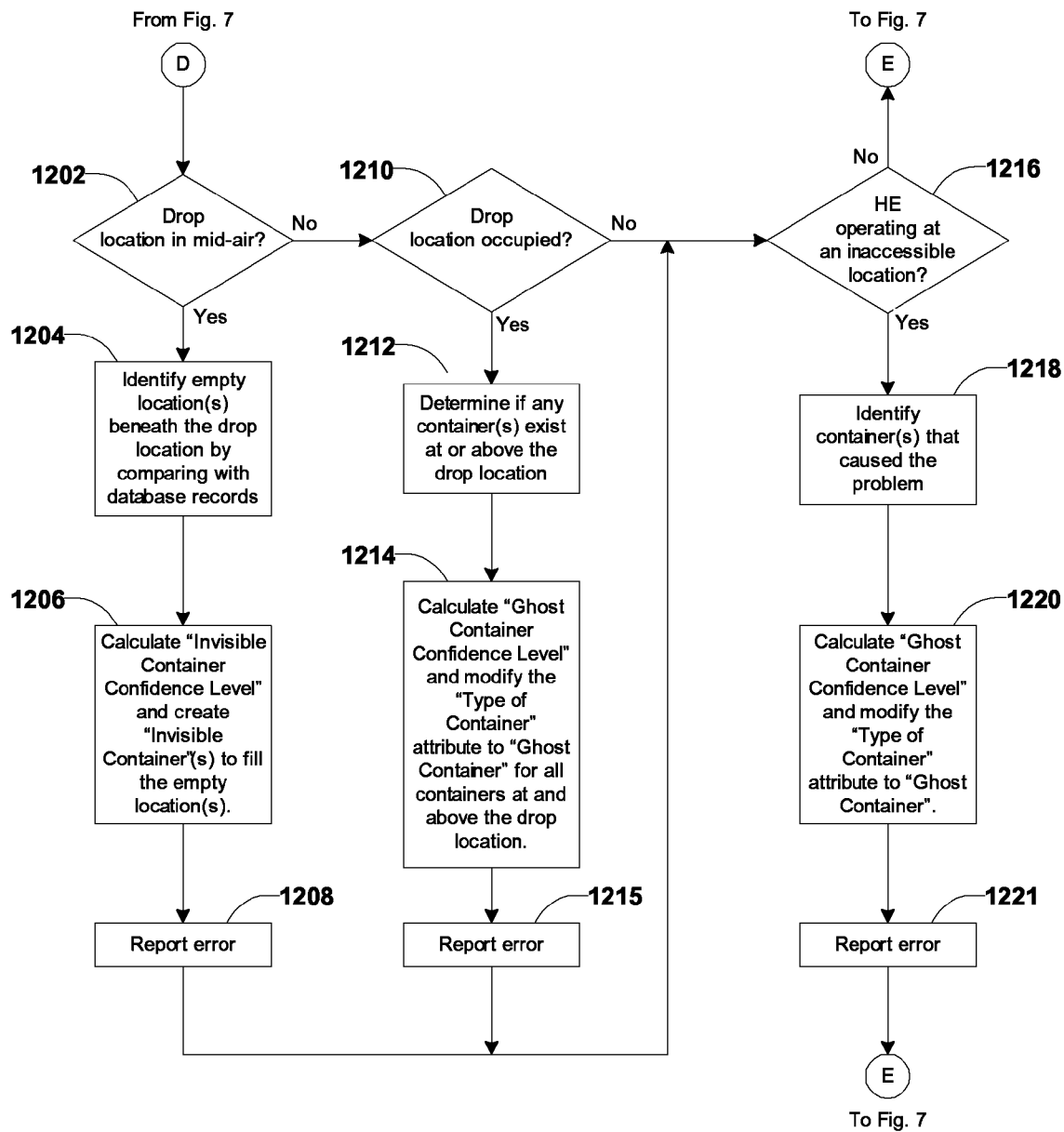
FIG. 12 is a flowchart showing the process of detecting inventory errors when a container drop event occurs.

Referring back to FIG. 7, if a container drop event has been detected through steps 702 through 706, the process continues to steps 1202 through 1220 in FIG. 12. In this embodiment, the set of error types corresponding to a container drop event includes drop location in mid-air, occupied drop location, and inaccessible operating location. The data conflict detection process then employs a checking process to examine whether a data error of any of the three error types has occurred. The first error checking step starts with step 1202, where the process determines if the drop location was in mid-air. This error type refers to the case in which a container was dropped or placed at a cell location where the Inventory Tracking Database did not reflect a container to exist immediately underneath it, providing the necessary physical support. Based on this error type, the data conflict process first determines a search criterion that includes cell locations under the drop location specified in the new data. If the drop location is at Tier 1, i.e., the base tier that rests immediately on the ground, there is no cell location beneath the drop location and the data conflict detection process directly concludes that the drop location is not in mid-air and proceeds to step 1210 for the next error checking step. Otherwise, the search criterion includes all cell locations beneath the drop location and the data conflict detection process uses this search criterion to query the Inventory Tracking Database 114 for any inventory data records associated with these cell locations. If the query returns no results for any of the cell locations beneath the drop location, or results indicating that the Inventory Tracking Database 114 does not contain any data record showing a container at the specified location beneath the drop location, the data conflict detection process then concludes that the drop location is indeed in mid-air and an error has occurred. In one embodiment, the data conflict detection process can bypass steps 1204 and 1206 and proceed to step 1208 to report the error together with the error type (i.e., drop location in mid-air). Alternatively, the process proceeds to steps 1204 and 1206 before reporting the error at step 1208.

At step 1204, the data conflict detection process identifies the unoccupied cell location(s) beneath the drop location based on the query results. More particularly, step 1204 identifies empty cell locations beneath the drop location by comparing the HE designated drop location with database records. With the assumption that the new inventory data is accurate and therefore there must be containers underneath the drop location in reality, the data conflict detection process at step 1206, creates a new inventory data record for each of the unoccupied cell locations beneath the drop location, and assigns a container to each of them. Since these containers were invisible to the Inventory Tracking Database before, they are marked, e.g., as "invisible container," in the "Type of Container" field in their respective data records. Furthermore, a confidence level, named the "Invisible Container Confidence Level," is also calculated at step 1206 based on the confidence level provided in the new inventory data; this confidence level is then included in each of the newly created data records. The data conflict detection process then reports the error with the error type and outputs the newly created data records including the newly calculated confidence level(s) at step 1208. Subsequently, the data conflict detection process proceeds to the next checking step to determine whether the HE is operating at an inaccessible location at step 1216.

Figure 13A:
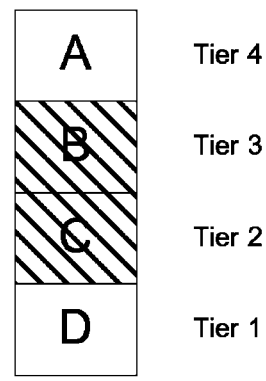
FIGS. 13A and 13B illustrate two examples of inventory errors when a container drop event occurs.

FIG. 13A illustrates an example where the drop location is in mid-air. As shown on the left, the Inventory Tracking Database indicates that Container D is at Tier 1 and no container is located above Container D. The new inventory data indicates Container A has been dropped at Tier 4. The data conflict detection process then identifies that there are three cell locations (Tier 1, Tier 2, and Tier 3) beneath the drop location at Tier 4; it then queries the Inventory Tracking Database for those three cell locations. The query returns only one data record showing Container D at Tier 1; thus no data records for Tier 2 and Tier 3 appear in the query results. Therefore, the data conflict detection process concludes that the drop location is in mid-air at step 1202 and identifies that the two cell locations at Tier 2 and Tier 3 need further processing at step 1204. Accordingly, at step 1206, the data conflict detection process creates two new data records, one for Tier 2 and the other for Tier 3, assigns two containers with their "Type of Container" attribute set to "invisible container" for the two newly created data records, and further computes and includes the confidence level in the two data records. The data conflict detection process then reports the error, outputs the two newly created data records including the newly calculated confidence level(s), and exits to step 1216 to examine whether the HE is operating at an inaccessible location.

Referring back to step 1202 of FIG. 12, if the drop location was not in mid-air, the process continues to step 1210 for the next error checking step to determine whether an error of the error type, occupied drop location, has occurred. At step 1210, the data conflict detection process determines if the drop location was already occupied by another container in the Inventory Tracking Database 114. To make that determination, the data conflict detection process first determines a search criterion based on the drop location in the new data; this search criterion includes the drop location and the cell location(s) above the drop location if the drop location is not at the top tier. The data conflict detection process then uses this search criterion to query the Inventory Tracking Database for inventory data records associated with these cell locations specified in the search criterion. If the query yields no results or results indicating no container at the drop location or the locations above the drop location, the data conflict detection process concludes that the drop location was not occupied and proceeds to the next error checking step at step 1216. Otherwise, the data conflict detection process concludes that the drop location was already occupied and therefore an error of this error type has occurred. In one embodiment, the data conflict detection process can directly bypass steps 1212 and 1214 and proceed to step 1215 to report the error with the error type; in another embodiment, the process continues to steps 1212 and 1214 before proceeding to report the error at step 1215.

At step 1212, the data conflict detection process reads or retrieves the data records in the query result for further processing. For the new inventory data that indicates the drop event to be correct, therefore the data records in the query results must be erroneous, and vice versa. That is, both the new inventory data and the data records in the query results could be wrong; hence, both of them are treated as erroneous data records. The data conflict detection process then in step 1214 modifies the "Type of Container" attribute to "Ghost Container" in each of the data records derived from the query results. The data conflict detection process further computes a new confidence level for each of the data records based on the confidence level of the drop event; this new confidence level is then added to the corresponding data records or replaces the confidence level originally in the data records. The data conflict detection process can also mark the new data to reflect the error and add an error flag to the new data. Subsequently, the data conflict process reports the error at step 1215, outputs the modified data records with the newly calculated confidence levels, and proceeds to the next error checking step at 1216.

Figure 13B:
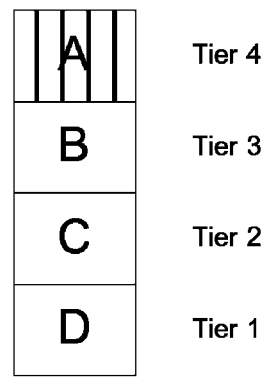

FIG. 13B illustrates an example where the drop location is already occupied. As shown on the left, the Inventory Tracking Database shows that there are four containers stacked together, occupying all four tiers of a specific location. A new inventory data indicates that a drop event has occurred, in which another container is placed at Tier 4 of the specific location. Accordingly, at step 1202, the data conflict detection process determines that the drop location is not in mid-air since the cell locations beneath Tier 4 are all occupied. The data conflict detection process then queries the Inventory Tracking Database for data records at the drop location (i.e., Tier 4 of the specific location) at step 1210, and the query yields a data record showing Container A already at the drop location (before the drop event). Hence, the data conflict detection process concludes that the drop location was occupied and proceeds to steps 1212 and 1214 to mark Container A as "Ghost Container" and to update its confidence level. After that, the data conflict detection process reports the error, outputs the modified data record with its newly calculated confidence level, and proceeds to the next error checking step at step 1216 to determine whether the HE is operating in an inaccessible location.

Referring back to FIG. 12, if the drop location was determined to be unoccupied at step 1210 or an error occurred at step 1208 or 1215, the data conflict detection process proceeds to step 1216 to determine if the HE is operating at an inaccessible location. The determination and the subsequent steps 1218 to 1221 are similar to the processing involved in steps 916 to 921; therefore, they are not repeated here.

Figure 14:
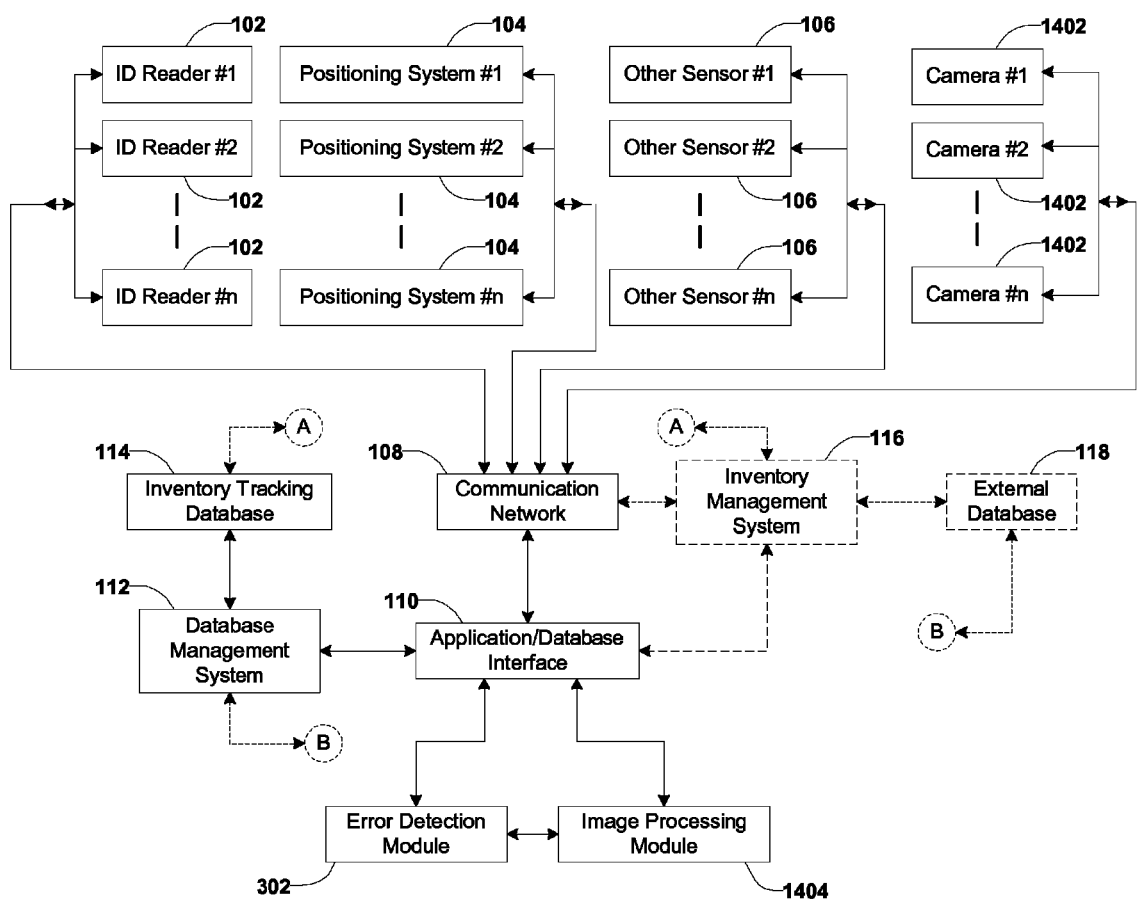
FIG. 14 shows a block diagram of an inventory tracking and management system with camera-based error detection for detecting inventory errors, particularly errors in the location of containers in a container shipping yard.

FIG. 14 shows an inventory tracking and management system with camera-based error detection for detecting inventory errors, particularly errors in locations of containers in a container shipping yard. In addition to the components shown in FIG. 3, this system further includes cameras 1402 and an Image Processing Module 1404. The cameras 1402 can be single-lens cameras, stereo cameras with two or more lenses, or sets of single-lens cameras with each set configured to serve as a stereo camera. The cameras 1402 can be installed at fixed locations (e.g., selected light poles) in the container shipping yard. Each camera (or each set of cameras) can be positioned toward a designated area of the yard, and it can also rotate within a pre-set range in order to cover a larger area than it would with a fixed angle. When distributed over the container shipping yard properly, these cameras 1402 can scan the whole yard and provide images to the Application/Database Interface 110 through the Communication Network 108. The Application/Database Interface 110 outputs the images to the Image Processing Module 1404, which processes the images to determine whether a cell location is occupied and generates inventory-validation data accordingly. The generated inventory-validation data is then sent to the Error Detection Module 302, which compares the inventory-validation data with data records in the Inventory Tracking Database 114 for error detection. The Application/Database Interface 110 may also display the images on a display for an operator to monitor operations and activities in the yard.

Figure 15:
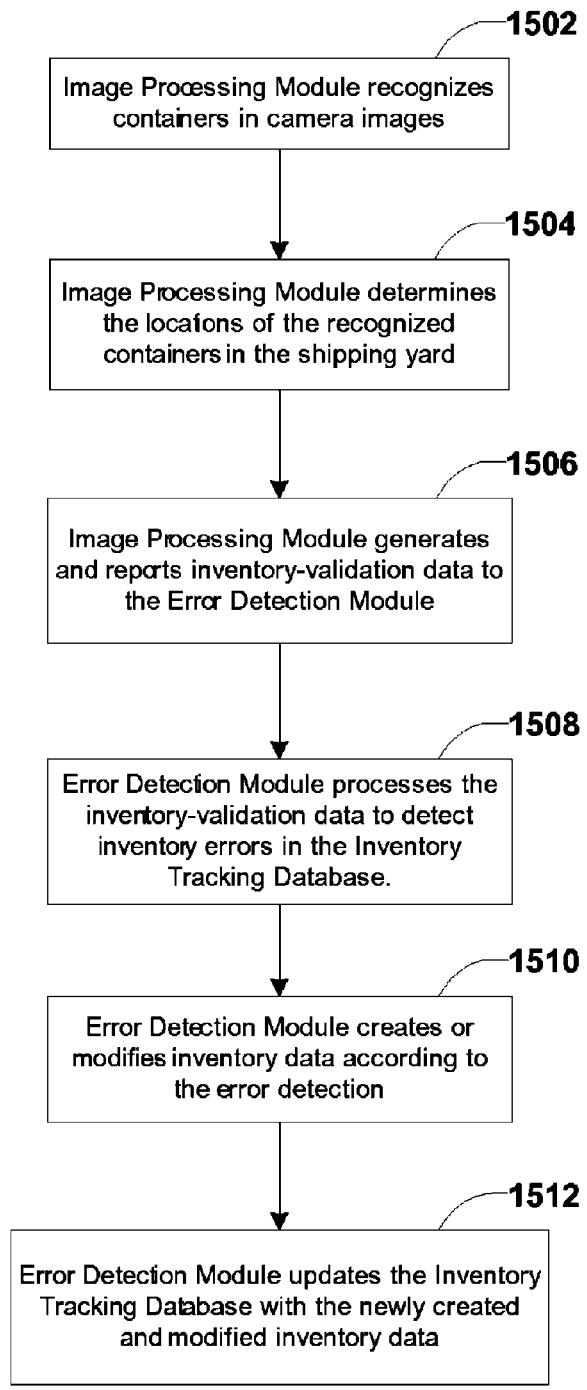
FIG. 15 is a flowchart showing the process of detecting inventory errors based on images from the cameras.

FIG. 15 is a flowchart showing the process of detecting inventory errors based on images from the cameras 1402. The process can be set to run at a specific time every day; it can also be initiated by an operator at any time or even run in real time. Starting at step 1502, the Image Processing Module 1404 receives camera images from the Application/Database Interface 110 and processes the images for container recognition. Various image processing techniques and pattern recognition techniques can be employed to recognize containers, e.g., by treating containers as cubes or cylinders (e.g., for tank containers) with specific dimensions; these techniques are well-known to those skilled in the art. By using such techniques, the Image Processing Module 1404 recognizes containers in an image as well as their (relative) positions (including height above ground) in the image, where each position is the position of the center of a container. The Image Processing Module 1404 may further identify attributes of the recognized containers; such attributes include the containers' colors, types, origins, manufacturers, and even container IDs.

Once containers are recognized together with their (relative) positions in the image, the Image Processing Module 1404 further determines the locations of the containers in the container shipping yard at step 1504. In one embodiment, the Image Processing Module 1404 determines the location of a container based on the location of the camera that provides the image, the camera's scanning angle at the time the image was taken, and the relative position of the container in the image. More specifically, since each camera is at a fixed location, its field of view (i.e., the area captured in the image) can be determined based on the camera location and scanning angle. As a result, a location profile that associates a field of view with the container shipping yard can be pre-determined for each camera at any specific scanning angle. Such a location profile can be represented by a two-column conversion table, with one column containing the cell locations (e.g., Row 101, Bay 21, Slot A, Tier 1) in the shipping yard and the other column containing the corresponding positions (e.g., px, py, and pz) in the image. Moreover, multiple location profiles can be built for a camera by selecting multiple (equally-spaced) scanning angles within the scanning range of the camera. The spacing of these scanning angles should be relatively small so that images taken at any scanning angle can be mapped correctly into the container shipping yard by using the location profile corresponding to the closest pre-selected scanning angle. Before mapping an image taken at any scanning angle, the Image Processing Module 1404 may rotate it so that the rotated image approximates an image taken at the closest pre-selected scanning angle. Subsequently, the Image Processing Module 1404 determines the locations of containers in the container shipping yard based on the location profiles.

In another embodiment, the Image Processing Module 1404 identifies landmarks in the image to determine the corresponding location in the container shipping yard for each recognized container. The landmarks can include line markers on the ground, nearby light poles, and other fixtures such as buildings in the field of view. Since the locations of these landmarks in the container shipping yard can be pre-determined, these landmarks can be used as reference points for determining the locations of the recognized containers in the shipping yard.

So far at both steps 1502 and 1504, the Image Processing Module has recognized containers in each image and determined their locations in the shipping yard. The Image Processing Module 1404 can further compare and correlate the container recognition results from multiple images taken by one camera, as well as the recognition results from images taken by multiple cameras, to further evaluate the consistency of the recognition result so as to achieve higher accuracy in the container recognition.

Subsequently at step 1506, the Image Processing Module 1404 generates inventory-validation data based on the container recognition and the locations of the recognized containers. For example, since each camera scans or covers a pre-determined designated area, the Image Processing Module 1404 can have a pre-determined template for the inventory-validation data for each camera. The template can be as simple as a two-column table, with one column listing all the cell locations in the designated area and the other column for indicating whether a container is detected at the corresponding cell location. The Image Processing Module 1404 fills in the second column based on the container recognition at step 1502 and the location determination at step 1504. The table may be expanded to include columns for other information such as the attributes of each recognized container and a time stamp for each row entry of the table; such a time stamp can be the time the corresponding image was taken. The Image Processing Module 1404 then reports these tables as the inventory-validation data to the Error Detection Module 302 at step 1506. Optionally, the Image Processing Module 1404 can combine the table for each camera into a single table and report the single table to the Error Detection Module 302.

At step 1508, the Error Detection Module 1404 processes the inventory-validation data from the Image Processing Module 1404 to detect inventory errors in the Inventory Tracking Database 114. The Error Detection Module 302 first queries the Inventory Tracking Database 114 for data records corresponding to the cell locations in the inventory-validation data, and then compares the query results with the inventory-validation data for any discrepancy between the two. If a cell location is occupied according to the inventory-validation data but the query results indicate that no container is at that cell location, the container at the location is regarded as a missing container or a container invisible to the Inventory Tracking Database 114. Similarly, if a cell location is not occupied according to the inventory-validation data while the query results indicate that there is a container there, the container is regarded as existing only in the Inventory Tracking Database 114 or a "ghost" container in the Database. Moreover, the Error Detection Module 302 can further compare the container attributes in the inventory-validation data with container attributes in the query results for error detection. For example, if according to the inventory-validation data the Image Processing Module 1404 recognized a 20-foot container at a cell location but the query results show that the container at the cell location is a 40-foot container; the Error Detection Module 302 then detects a discrepancy in attributes at the cell location. All three cases of discrepancies indicate errors in the Inventory Tracking Database 114.

At step 1510, the Error Detection Module 302 further creates or modifies inventory data according to the error detection. More specifically, the Error Detection Module 302 creates an inventory data record for each cell location where a missing container is identified; the Error Detection Module 302 also marks the container property in this newly created data record (e.g., as "Invisible Container") to indicate that the container was invisible to the Inventory Tracking Database 114. For cell locations where "ghost" containers are identified, the Error Detection Module 302 modifies the corresponding data record in the query result to reflect the error, e.g., by marking the container property as "Ghost Container." For cell locations with mismatched attributes, the Error Detection Module 302 can modify the corresponding data records in the query result to add the attributes in the inventory-validation data (which are the attributes recognized by the Image Processing Module). The Error Detection Module 302 can further add a confidence level to the data record using a pre-determined confidence level associated with the Image Processing Module 1404.

Subsequently at step 1512, the Error Detection Module 302 reports the newly created data records and the modified data records to the Inventory Tracking Database 114 for an update.

In a separate embodiment, cameras installed on HEs or monitoring vehicles can be used either alone or in conjunction with the cameras installed at fixed locations. Since these cameras are mobile, the Image Processing Module 1404 determines the locations of the recognized containers by recognizing landmarks and using landmark locations as references. Alternatively, the Image Processing Module 1404 can use positions of the vehicle that carries the camera for determining the locations of containers. Subsequently, the Error Detection Module 302 detects errors and creates or modifies inventory data as described with FIG. 15.

Figure 16:
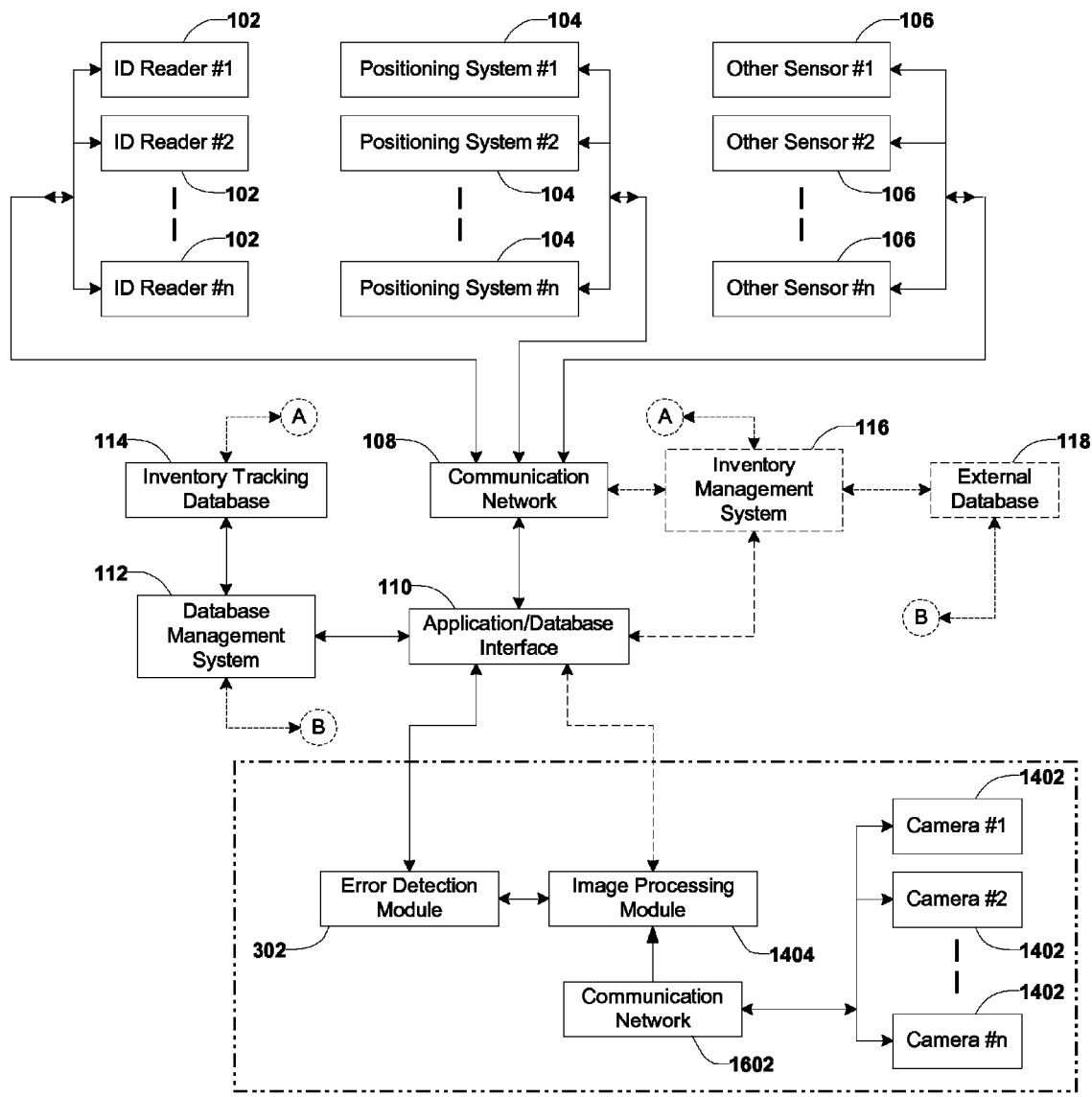
FIG. 16 shows a block diagram for a camera-based inventory error detection system that interfaces with an inventory tracking system for detecting errors in an inventory tracking database associated with the inventory tracking system.

FIG. 16 shows an embodiment of a camera-based inventory error detection system interfacing with an inventory tracking system for detecting errors in an inventory tracking database associated with the inventory tracking system. The camera-based inventory error detection system includes the cameras 1402, a separate wired and/or wireless communication network 1602, the image processing module 1404, and the error detection module 302. The communication network 1602 directly connects the cameras 1402 with the image processing module 1404 for transmitting images generated by the cameras to the image processing module 1404; therefore, the image processing module 1404 does not need to receive the images through the Application/Database Interface 110 as shown in FIG. 14. Hence, the camera-based inventory error detection system becomes an independent system interfacing with the inventory tracking system, which may be preferred in some applications. The processing involved in the image processing module 1404 and the error detection module 302 is similar to the process shown in FIG. 15, which was described before together with the inventory tracking and error detection system in FIG. 14.

Although the present invention has been described above with particularity, this was merely to teach one of ordinary skill in the art how to make and use the invention. Many additional modifications will fall within the scope of the invention, as that scope is defined by the following claims.

What is claimed:

1. A method performed by at least one processor for detecting errors in a container inventory database provided in a memory device readable by the at least one processor associated with a container inventory tracking system of a container storage facility, the method comprising:
    obtaining at least one first data record, wherein the first data record is provided by at least one of the following data sources comprising: the container inventory tracking system, an inventory management system associated with the inventory tracking mechanism, an input device for accepting entries from an operator, and a computer program configured to generate the at least one data record;
    identifying an event among a pre-defined set of events based on the first data record associated with the container inventory and container handling equipment in the facility;
    providing a list of error types based on the identified event; and
    determining whether a data error has occurred through an error checking process, wherein for a plurality of the error types in the list the error checking process comprises:
        selecting an error type from the list of error types;
        determining a search criterion based on the selected error type and the first data record;
        querying the container inventory database using the determined search criterion and obtaining query results from the container inventory database;
        comparing the first data record together with data records in the inquiry results to detect data conflicts between the first data record and the data records in the inquiry results; and
    reporting that the data error of the selected error type has been detected upon the detection of the data conflicts.

2. The method in claim 1, wherein the first data record comprises at least one of the following: a position of handling equipment, a position of a container, and a container cell location in the container storage facility.

3. The method in claim 1, wherein
    the pre-defined list of events comprises: a container pickup event, a container drop event, and a vehicle movement event.

4. The method in claim 3, wherein,
    upon identification of the vehicle movement event, the list of error types comprises a movement violation error indicating movement of the container handling equipment across locations occupied with containers according to the container inventory database,
    upon identification of the container pickup event, the list of error types comprises: no container available for pickup, inaccessible pickup location, and inaccessible operating location, and
    upon identification of the container drop event, the list of error types comprises: drop location in mid-air, occupied drop location, and inaccessible operating location.

5. The method in claim 1, upon detection of the data errors, further comprising
    identifying, among the query results, data records that are affected by the data conflicts as erroneous data records, and
    reporting the erroneous data records to at least one of the following: the container inventory tracking system, the inventory management system associated with the inventory tracking system, an output device for displaying the erroneous data records to an operator, and a computer program configured to receive the erroneous data records.

6. The method in claim 5, further comprising creating tables in the container inventory database, and recording the erroneous data records to the tables.

7. The method in claim 5 further comprising modifying the erroneous data records by changing values in data fields of the erroneous data records to indicate the error.

8. The method in claim 7 further comprising recording the modified erroneous data records to the container inventory database, whereby an operator can find the erroneous data records by searching for the changed values in the data fields.

9. The method in claim 8, where in the modification further comprises:
    computing a probability measure for each of the erroneous data records based on the erroneous data record, the first data record, and the identified error type, and
    writing the probability measure to each of the erroneous data records,
    whereby the probability measure represents a confidence level for the detected data error.

10. A container inventory tracking and error detection system, comprising:
    a container inventory tracking system that tracks containers in a container storage facility, provides inventory data associated with the containers and container handling equipment, and stores the inventory data in an inventory tracking database, an error detection module provided in a processor that obtains at least one first inventory data from the container inventory tracking system, identifies an event among a predefined set of events based on the first inventory data, provides a list of error types based on the identified event, and determines whether an error of any of the error types has occurred;

wherein the error detection module is configured to determine whether an error of any of the error types has occurred by employing an error checking process, wherein for a plurality of error types in the list the process:

selects an error type from the list of error types;

determines a search criterion based on the selected error type and the first data record;

queries the inventory tracking database using the determined search criterion and obtains query results from the inventory tracking database;

compares the first data record with data records in the query results to detect data conflicts between the first data record and the data records in the query results.

11. The container inventory tracking and error detection system of claim 10, wherein the identified event comprises at least one of a container pickup event, a container drop event, and a vehicle movement event.

12. A container inventory error detection system for detecting errors in an inventory tracking database associated with a container inventory tracking system of a container storage facility, comprising:

image generating devices that provide images of the container storage facility;

an image processing module that receives images provided by the image generating devices, recognizes containers in the images, determines locations of the recognized containers in the container storage facility based on the images, and generates inventory-validation data based on the recognized containers and their locations;

a communication network that connects the image generating devices with the image processing module for transmitting images provided by the image generating devices to the image processing module; and an error detection module that receives the inventory-validation data, queries the inventory tracking database based on the inventory-validation data, and compares the inventory-validation data with the query results to detect errors in the inventory tracking database;

wherein the error detection module is configured to determine whether an error of any of a list of error types has occurred by employing an error checking process, wherein for a plurality of error types in the list the process:

selects an error type from the list of error types;

determines a search criterion based on the selected error type and the inventory-validation data;

queries the inventory tracking database using the determined search criterion and obtains query results from the inventory tracking database;

compares the inventory-validation data with data records in the query results to detect data conflicts between the inventory-validation data and the data records in the query results.

13. The container inventory error detection system in claim 12, wherein the image generating devices comprise at least one camera and the image generating devices are installed at fixed locations in the container storage facility.

14. The container inventory error detection system in claim 12, wherein the image generating devices are installed on handling equipment that can move around in the container storage facility.

15. The container inventory error detection system in claim 12, wherein the image processing module further identifies attributes of the recognized containers to obtain the inventory-validation data, wherein the attributes comprise at least one of the following: sizes, colors, types, origins, manufacturers and container IDs, and the error detection module further compares the identified container attributes with container attributes in the query results to detect the errors.

16. The container inventory error detection system in claim 12, wherein the error detection module further creates new inventory data and modifies inventory data in the query results according to the error detection, and updates the inventory tracking database with the new inventory data and the modified inventory data.

* * * * *